(12) United States Patent
Yamamoto et al.

(10) Patent No.: US 6,432,887 B1
(45) Date of Patent: Aug. 13, 2002

(54) ROLLING DEVICE

(75) Inventors: Toyohisa Yamamoto; Kenichi Iso; Atsushi Oda, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/679,026

(22) Filed: Oct. 4, 2000

Related U.S. Application Data

(63) Continuation of application No. PCT/JP00/00761, filed on Feb. 10, 2000.

(30) Foreign Application Priority Data

Feb. 12, 1999 (JP) ............................................. 11-034233
Mar. 24, 1999 (JP) ............................................. 11-079636

(51) Int. Cl.$^7$ ....................... C10M 105/50; F16C 33/30
(52) U.S. Cl. ..................... 508/138; 508/182; 508/206; 508/582; 508/590; 384/462
(58) Field of Search ................................. 508/181, 182, 508/183, 132, 582

(56) References Cited

U.S. PATENT DOCUMENTS

| | | | | |
|---|---|---|---|---|
| 4,324,673 A | * | 4/1982 | Christian et al. .......... 252/51.5 |
| 4,525,286 A | * | 6/1985 | Reick ........................... 252/21 |
| 4,724,092 A | * | 2/1988 | Fukui et al. .................. 252/54 |
| 4,803,005 A | * | 2/1989 | Juhlke et al. ................. 252/58 |
| 4,925,583 A | * | 5/1990 | Juhlke et al. ................. 252/58 |
| 4,985,161 A | * | 1/1991 | Tohzuka et al. .............. 252/54 |
| 5,032,302 A | * | 7/1991 | Juhlke et al. ................. 252/54 |
| 5,124,058 A | * | 6/1992 | Corti et al. ................... 252/54 |
| 6,025,307 A | * | 2/2000 | Chittofrati et al. .......... 508/182 |
| 6,040,277 A | * | 3/2000 | Caporiccio .................. 508/155 |

* cited by examiner

*Primary Examiner*—Ellen M. McAvoy
(74) *Attorney, Agent, or Firm*—Christensen O'Connor Johnson Kindness PLLC

(57) ABSTRACT

The rolling device of the present invention utilizes any one of 1) a lubricant containing a liquid fluorinated polymer oil having a kinetic viscosity at −20° C. falling within a range of between 100 mm$^2$/sec and 3,000 mm$^2$/sec and a vapor pressure at 50° C. not higher than $2\times10^{-4}$ Torr, 2) a lubricant containing a liquid fluorinated polymer oil having a kinetic viscosity at 40° C. falling within a range of between 10 mm$^2$/sec and 400 mm$^2$/sec and having a kinetic viscosity at 100° C. falling within a range of between 3 mm$^2$/sec and 80 mm$^2$/sec, and 3) a lubricant constituted by a grease composition containing a mixture of a liquid fluorinated polymer oil having a kinetic viscosity at 40° C. falling within a range of between 10 mm$^2$/sec and 400 mm$^2$/sec as a base oil and a thickening agent.

12 Claims, 6 Drawing Sheets

ROLLING DEVICE

CROSS REFERENCE TO RELATED APPLICATIONS

This is a Continuation of application Ser. No. PCT/JP00/00761, filed Feb. 10, 2000.

This application is based upon and claims the benefit of priority from the prior Japanese Patent Applications No. 11-034233, filed Feb. 12, 1999; and No. 11-079636, filed Mar. 24, 1999, the entire contents of which are incorporated herein by reference.

BACKGROUND OF THE INVENTION

The present invention relates to a rolling device, particularly to a rolling device using a lubricant.

In general, in a rolling device such as a ball-and-roller bearing or a rectilinear device, abrasion of the rolling body and the member in contact with the rolling body is prevented by circulating or sealing a lubricant such as a lubricating oil like a mineral oil or poly-α-olefin oil or a grease within the rolling device.

Such a rolling device can be used under the ordinary use conditions without giving rise to a problem. However, where the rolling device is driven under, for example, a high temperature, high speed or vacuum condition, the lubricant is scattered to the outside of the rolling device, or the lubricant is evaporated to generate a gas. As a result, the outer environment of the rolling device is contaminated. For that reason, a fluorine-based grease is used in many cases as a lubricant of the rolling device in an apparatus used in a clean room such as a semiconductor manufacturing apparatus, a liquid crystal panel manufacturing equipment and a hard disk manufacturing equipment; a vacuum equipment in which the rolling device is exposed to a vacuum condition such as a vacuum pump; and the equipment used under high temperatures.

The fluorine-based grease is a mixture of a liquid fluorinated polymer oil as a base oil and a solid fluorinated polymer as a thickener. In general, the fluorine-based grease is very low in its volatility, and the amount of the grease scattered to the outside of the rolling device or evaporated is very small. It follows that the outer environment of the rolling device is relatively unlikely to be contaminated.

However, the liquid fluorinated polymer contained in the fluorine-based grease has in general a high viscosity, leading to a difficulty, particularly where the rolling device using the fluorine-based grease as a lubricant is driven at a high speed. Specifically, since the lubricant has a large resistance to stirring, the torque is rendered excessively high so as to increase the heat generation. As a result, in the case of the ball-and-roller bearing, the inner ring, the outer ring, and the rolling body are expanded. It follows that the clearance between the adjacent members is diminished so as to make the load excessively large at the contact surfaces between the inner ring and the rolling body and between the outer ring and the rolling body. As a result, an abnormal abrasion and seizing are brought about so as to render the rolling device unusable in a short time. Naturally, the rolling device must be renewed frequently.

Also, in recent years, the evacuation capacity and the evacuation rate tend to be increased in the vacuum pump. To be more specific, the rotating speed of the rolling device used in the vacuum pump is sharply increased nowadays. Therefore, the heat generation is increased so as to bring about the abnormal abrasion and seizing as described above. As a result, the rolling device is rendered unusable in a short time and the vacuum pump is rendered inoperable in a short time.

As described above, where a fluorine-base grease is used as a lubricant of a rolling device operated under a high temperature, high speed or vacuum condition, an abnormal abrasion and seizing tend to be derived from the high viscosity of the fluorine-based grease. Naturally, it is desirable for the rolling device used under a high temperature, high speed or vacuum condition to be driven without inviting contamination of the outer environment and an increased torque.

The problem described above takes place not only under a high temperature, high speed or vacuum condition but also under a low temperature condition. When it comes to a rolling device used in, for example, an equipment for cooling or freezing an electronic element, the temperature elevation is derived from the resistance to stirring accompanying the driving of the rolling device. As a result, where a mineral oil, poly-α-olefin oil or the like is used as the lubricant of the rolling device, the outer environment of the rolling device, e.g., the coolant used for the cooling or freezing, is contaminated. Thus, the cooled element such as the electronic element is contaminated with the lubricant component. Also, since, in this case, the evaporation and disappearance of the lubricant are promoted by the coolant, a sufficient lubricity ceases to be obtained by the use for a short time. Under the circumstances, the fluorine-based grease was widely used in the past as a lubricant of the rolling device under the condition requiring a low temperature and a clean environment as in the refrigerator and freezer.

However, the ordinary fluorine-based grease has a high viscosity, as already pointed out. Particularly, the fluorine-based grease has a very high viscosity under a low temperature condition, giving rise to an increase in the resistance to stirring, i.e., an increase in the torque of the rolling device. As a result, it is impossible to drive the rolling device in some cases. Also, even if the rolling device can be driven, an excessively large load is applied to the motor for driving the rolling device. In addition, the heat generation accompanying the driving of the motor is rendered excessively large so as to evaporate the lubricant and, thus, to contaminate the coolant.

It should also be noted that some of the fluorine-based greases has a high vapor pressure. Where such a fluorine-base grease is used as a lubricant of the rolling device used under the low temperature condition, the evaporation caused by the heat generation noted above is rendered more prominent. In this case, the evaporation and disappearance of the lubricant are promoted by the coolant, as pointed out above, with the result that a sufficient lubricity ceases to be obtained in a very short time.

In accordance with miniaturization of the design rule of the electronic element in recent years, demands for preventing contamination tend to become severer and severer against the cooling and freezing equipment of the electronic element. Also, in accordance with miniaturization and energy saving of the cooling and freezing devices, the torque of the rolling device constituting a part of the driving section tends to be decreased so as to suppress the loss of the power and to prolong the life of the driving section, thereby achieving a mechanism free from maintenance.

However, the lubricant used in the conventional rolling device gives rise to an increase in the torque and to contamination of the cooled member. In addition, the lubricant gives rise to the problem that a sufficient lubricity ceases to be obtained in a short time. Under the circumstances, it is desirable for the rolling device used under low temperature conditions to be driven without giving rise to contamination of the outer environment and to an increase in the torque.

The problem derived from the lubricant is generated not only in the case where the rolling device is used in the apparatus described above. In other words, the problem derived from the lubricant is also generated in the case where the rolling device is used for the other purposes, as described below.

As widely known to the art, a ball-and-roller bearing using grease as a lubricant is utilized in general in the electrical components of an automobile, an alternator that is an auxiliary member of an engine, an intermediate pulley, an electromagnetic clutch for an automotive air conditioner, etc.

Diminishment of an engine room is required for the automobile in accordance with popularization of a front-wheel-drive vehicle intended to miniaturize and decrease the weight of the automobile and with requirement for an enlarged cabin. Such being the situation, vigorous efforts are being made in an attempt to miniaturize and decrease the weight of the electrical components, the auxiliary members of the engine, etc. However, it is unavoidable for the miniaturization to be accompanied by reduction of output. Therefore, the reduction in the output is compensated by driving, for example, the alternator or the electromagnetic clutch for the automotive air conditioner at a higher speed. Naturally, the intermediate pulley is also driven at a high speed.

It is also required that the quietness of the automobile be increased. To meet this requirement, the sealing of the engine room is being promoted. However, the sealing of the engine room, which is certainly effective for improving the quietness, promote the temperature elevation within the engine room. It follows that the various parts within the engine room are required to exhibit a higher resistance to heat.

Nowadays, a grease prepared by adding a urea compound as a thickener to a base oil of a synthetic oil is used as a lubricant of a ball-and-roller bearing in the above-noted parts used in the field described above. The urea-synthetic oil series grease exhibits a sufficiently long lubricant life of the bearing under temperatures up to about 170° C. to 180° C. Therefore, if the temperature of the ball-and-roller bearing is elevated to only about 170° C. to 180° C., the particular grease can be used sufficiently as a lubricant of the ball-and-roller bearing.

However, the rolling bearing tends to be exposed to higher temperatures in recent years. For example, in a certain alternator, the cooling water of a radiator is used for the cooling inside the alternator, with the result that the bearing temperature exceeds 200° C. in some cases. Where the above-noted urea-synthetic oil series grease is used as a lubricant in a ball-and-roller bearing whose temperature is increased to about 200° C., the grease is hardened by evaporation of the base oil. In some cases, the thickener is broken so as to soften the grease. As a result, a problem is generated that the seizing is generated in an early stage.

BRIEF SUMMARY OF THE INVENTION

An object of the present invention is to provide a rolling device adapted for use under a severe condition such as a high temperature, a high operating speed, a vacuum and a low temperature conditions and exhibiting an excellent torque life even if driven under such a severe condition.

Another object is to provide a rolling device adapted for use under a severe condition such as a high temperature, a high operating speed, a vacuum and a low temperature conditions, capable of suppressing contamination of the outer environment, and exhibiting an excellent torque life, even if driven under such a severe condition.

Further, still another object of the present invention is to provide a rolling device exhibiting a sufficient resistance to seizing even under the condition of a high temperature, a high operating speed, and a heavy load.

According to a first aspect of the present invention, there is provided a rolling device comprising a movable member capable of a rotary movement or a linear movement, a support member supporting the movable member, a rolling body interposed between the movable member and the support member and rolled in accordance with the movement of the movable member, and a lubricant arranged between the movable member and the support member on which the rolling body is rolled, wherein the lubricant is a grease composition containing a mixture of base oil and a thickener, the base oil being a liquid fluorinated polymer oil having a kinetic viscosity at 40° C. of 10 $mm^2$/sec to 400 $mm^2$/sec.

According to a second aspect of the present invention, there is provided a rolling device comprising a movable member capable of a rotary movement or a linear movement, a support member supporting the movable member, a rolling body interposed between the movable member and the support member and rolled in accordance with the movement of the movable member, and a lubricant arranged between the movable member and the support member on which the rolling body is rolled, wherein the lubricant contains as a base oil either one of (1) a liquid fluorinated polymer oil having a kinetic viscosity at −20° C. falling within a range of between 100 $mm^2$/sec and 3,000 $mm^2$/sec, and a vapor pressure at 50° C. of $2 \times 10^{-4}$ Torr or less, and (2) a liquid fluorinated polymer oil having a kinetic viscosity at 40° C. of 10 $mm^2$/sec to 400 $mm^2$/sec and a kinetic viscosity at 100° C. of 3 $mm^2$/sec to 80 $mm^2$/sec.

In the rolling device of the present invention, a predetermined liquid fluorinated polymer oil is used as a base oil of the lubricant, with the result that rolling device can be used satisfactorily even under severe conditions.

For example, in the rolling device of the present invention, the lubricant containing as a base oil a liquid fluorinated polymer oil having a kinetic viscosity at −20° C. of 100 $mm^2$/sec to 3,000 $mm^2$/sec and having a vapor pressure at 50° C. of $2 \times 10^{-4}$ Torr or less is adapted for use under low temperature conditions.

Where the rolling device of the present invention is used under these conditions, it is desirable for the liquid fluorinated polymer oil to exhibit a kinetic viscosity at −20° C. falling within a range of between 100 $mm^2$/sec and 2500 $mm^2$/sec and to exhibit a vapor pressure at 50° C. of $5 \times 10^{-5}$ Torr or less. It is more desirable for the liquid fluorinated polymer oil to exhibit a kinetic viscosity at −20° C. falling within a range of between 100 $mm^2$/sec and 2000 $mm^2$/sec and to exhibit a vapor pressure at 50° C. of $2 \times 10^{-5}$ Torr or less.

The rolling device of the present invention, the lubricant of which contains as a base oil a liquid fluorinated polymer oil exhibiting a kinetic viscosity at 40° C. of 10 $mm^2$/sec to 400 $mm^2$/sec and a kinetic viscosity at 100° C. of 3 $mm^2$/sec to 80 $mm^2$/sec, is adapted for use under a high temperature, high operating speed or vacuum condition.

Where the rolling device of the present invention is used under such a condition, it is desirable for the liquid fluorinated polymer oil to exhibit a kinetic viscosity at 40° C. of 13 mm²/sec to 320 mm²/sec and to exhibit a kinetic viscosity at 100° C. of 4 mm²/sec to 60 mm²/sec. It is more desirable for the liquid fluorinated polymer oil to exhibit a kinetic viscosity at 40° C. of 15 mm²/sec to 270 mm²/sec and to exhibit a kinetic viscosity at 100° C. of 5 mm²/sec to 50 mm²/sec.

Also, where the rolling device of the present invention is used under a high temperature, high operating speed or vacuum condition, it is desirable for the lubricant to contain an oily compound having a perfluoropolyether skeleton as a backbone chain, with a polar group at one end or both ends of the backbone chain, and having a molecular weight not higher than 10,000. It is desirable for the oily compound to be contained in the lubricant in an amount of 0.5 to 10% by weight.

The rolling device of the present invention, in which the lubricant is a grease composition containing a mixture of a base oil and a thickener and the base oil is a liquid fluorinated polymer oil having a kinetic viscosity at 40° C. of 10 mm²/sec to 400 mm²/sec, is adapted for use under high temperature, high operating speed and heavy load condition.

Where the rolling device of the present invention is used under the condition, it is desirable for the liquid fluorinated polymer oil to exhibit a kinetic viscosity at 40° C. of 13 mm²/sec to 320 mm²/sec. It is more desirable for the liquid fluorinated polymer oil to exhibit a kinetic viscosity at 40° C. of 15 mm²/sec to 270 mm²/sec.

In the rolling device of the present invention, it is desirable for the lubricant to contain as a thickener at least one material selected from the group consisting of a solid fluorinated polymer, a layered mineral powder, an ultra fine particle and a white powder substantially all the components thereof being nonmetal elements.

Where the lubricant contains a thickener defined above, it is desirable for the thickener to be contained in an amount of 10 to 45% by weight, preferably 15 to 40% by weight, and more preferably 20 to 35% by weight, based on the total amount of the lubricant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
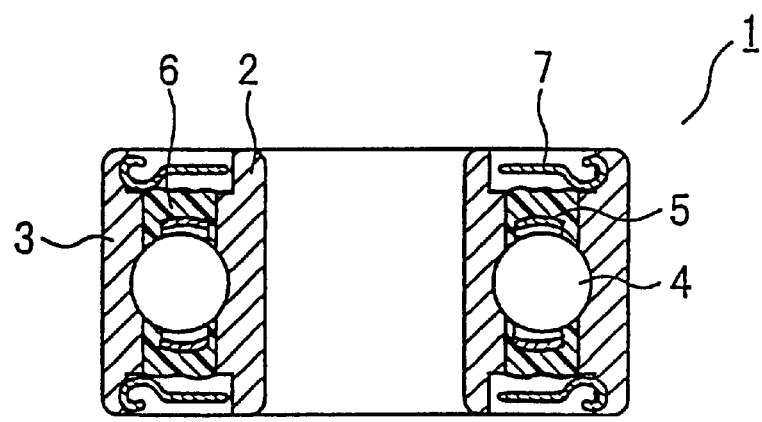
FIG. 1 is a cross sectional view showing a rolling device according to examples of the present invention.

The present invention will now be described more in detail.

The rolling device of the present invention is used mainly under a high temperature, high operating speed, vacuum or low temperature condition. Therefore, the rolling devices according to the first to third embodiments described below are the device adapted for use under a low temperature condition, the device adapted for use under a high temperature, a high operating speed or vacuum condition, and the device adapted for use under a high temperature, high operating speed and heavy load condition, respectively.

The rolling devices according to the first to third embodiments of the present invention are used as ball-and-roller bearings, rectilinear devices, or the like. The term "rectilinear device" represents a rectilinear driving device such as a ball screw device or a rectilinear guide device such as a linear guide. Each of these ball-and-roller bearing and rectilinear device is constructed such that a movable member is supported on a support member with a rolling body interposed therebetween, and a lubricant is arranged between the support member and the movable member. The following description covers the cases where the rolling devices according to the first to third embodiments of the present invention are applied to a ball-and-roller bearing, a rectilinear driving device, and a rectilinear guide device.

Where the rolling device according to the first to third embodiments of the present invention are used as the ball-and-roller bearing, a cylindrical outer ring is used as the support member, and an inner ring having an outer diameter smaller than the inner diameter of the outer ring is used as the movable member. Also, in the ball-and-roller bearing, the inner ring and the outer ring are coaxially arranged. A groove-like track is formed on each of the outer circumferential surface of the inner ring and the inner circumferential surface of the outer ring. The clearance between the inner ring and the outer ring is determined to permit the rolling body to be rolled along the track on each of the inner ring and the outer ring. Further, a lubricant is arranged between the inner ring and the outer ring so as to prevent the rolling body, etc. from being abraded.

In the ball-and-roller bearing of the particular construction, the inner ring is rotated relative to the outer ring by the force acting from the outside, but is not moved in the axial direction. Therefore, the rolling body may be a spherical ball or a columnar or conical roller.

Where the rolling device according to the first to third embodiments of the present invention are used as a rectilinear driving device, a threaded shaft having a screw groove formed on the side surface can be used as the support member. On the other hand, a nut having a screw groove formed on that surface which faces the threaded shaft is used as the movable member, and the rolling body is arranged such that the rolling body can be rolled between the threaded shaft and the screw groove of the nut.

It follows that the rolling body can be moved in the axial direction of the threaded shaft by suppressing the rotation of the nut and by rotating the threaded shaft and, thus, the nut can be moved in the axial direction of the threaded shaft. Incidentally, in this rectilinear driving device, the rolling body is spherical and the nut is constructed to permit the rolling body to be circulated within the screw groove.

The rolling body according to the first to third embodiment of the present invention can also be used as a rectilinear guide device. In this rectilinear guide device, a guiding shaft having no screw groove formed on the side wall is used as the support member, and a slider movable in the axial direction of the guiding shaft is used as the movable member. In this rectilinear guide device, the rolling body is arranged between the slider and the guiding shaft so as to be capable of rolling, thereby permitting the slider to be moved in the axial direction of the guiding shaft by the force applied from the outside. Alternatively, it is possible to arrange the rolling body to be embedded in the slider or the guiding shaft.

The rolling device described above is similar in construction to the conventional rolling device, except that the lubricant used in the present invention differs from that used in the conventional device. Therefore, the materials used generally in the conventional device can be used for forming the support member, the rolling body and the movable member and, thus, these materials are not particularly limited in the present invention. However, it is desirable to use, for example, the bearing steels such as SUJ2 or NSJ2; metal steels such as stainless steels, e.g., SUS440C, ES-1, LNS125 and SUS630; and ceramic materials such as silicon nitride ($Si_3N_4$), silicon carbide (SiC), Sialon, a partially stabilized zirconia ($ZrO_2$) and alumina ($Al_2O_3$). These materials can be used singly or in combination. Particularly, where the outer surface or the entire region of the rolling body is formed of a ceramic material, the rolling body can be driven satisfactorily over a long period of time even if a lubricating film of an oil or grease is not formed sufficiently, because the ceramic materials are unlikely to be agglutinated.

The lubricant used in the rolling devices according to the first to third embodiments of the present invention will be described as follows. The lubricant used in the rolling devices according to the first to third embodiments of the present invention is arranged between the movable member and the support member in order to prevent the abrasion and lower the contact resistance at the rolling contact surface of the rolling body and at the sliding contact surface between the movable member and the support member. Also, the rolling devices according to the first to third embodiments of the present invention slightly differ from each other in the composition of the lubricant used. The lubricant used in the rolling device according to the first embodiment of the present invention will now be described first.

The lubricant used in the rolling device according to the first embodiment of the present invention permits driving the rolling device satisfactorily under low temperature conditions. Specifically, the lubricant contains as a base oil a liquid fluorinated polymer oil having a kinetic viscosity at $-20°$ C. of 100 $mm^2$/sec to 3,000 $mm^2$/sec and having a vapor pressure at 50° C. of $2 \times 10^{-4}$ Torr or less.

Where the liquid fluorinated polymer oil has a kinetic viscosity lower than 100 $mm^2$/sec at $-20°$ C., it is possible for the liquid fluorinated polymer oil to leak from the rolling device during operation of the rolling device. As a result, the amount of the lubricant is rendered insufficient. Alternatively, an oil film fails to be formed sufficiently on the rolling contact surface or the sliding contact surface, with the result that the rolling body is brought into direct contact with the movable member and the support member, leading to a markedly short torque life. Alternatively, an outer environment such as the coolant tends to be contaminated.

On the other hand, where the kinetic viscosity of the liquid fluorinated polymer oil is higher than 3,000 $mm^2$/sec at $-20°$ C., the resistance of the lubricant to stirring is rendered excessively high. To be more specific, the torque of the rolling device is increased so as to increase the loss of power of the motor or the like. Also, since the amount of the heat generation accompanying the driving is increased, the evaporation of the lubricant is promoted. As a result, the lubricant is released into an outer environment such as a coolant so as to contaminate the cooled member such as an electronic element.

Also, where the vapor pressure of the liquid fluorinated polymer oil at 50° C. is higher than $2 \times 10^{-4}$ Torr, the polymer oil is easily evaporated so as to markedly shorten the torque life. Alternatively, the outer environment such as a coolant tends to be contaminated.

On the other hand, in the case of using a liquid fluorinated polymer oil having a vapor pressure at 50° C. of $2 \times 10^{-4}$ Torr or less as a base oil, it is possible to suppress evaporation of the lubricant. Also, where the kinetic viscosity at $-20°$ C. of the liquid fluorinated polymer oil falls within a range of between 100 $mm^2$/sec and 3,000 $mm^2$/sec, the rolling device can be driven at a low torque because the resistance of the lubricant to stirring is low under the low temperature conditions. It follows that it is possible to suppress the loss of power generated from the motor in the case of using the lubricant under the low temperature conditions. Also, since the torque is diminished, it is possible to suppress the heat generation accompanying the driving of the rolling device, with the result that the evaporation of the lubricant can be controlled more effectively. In other words, even where the rolling device is driven under the low temperature conditions, it is possible to suppress the contamination of the outer environment and to obtain an excellent torque life.

In the first embodiment of the present invention, it is desirable for the base oil to consist of a liquid fluorinated polymer having a kinetic viscosity at $-20°$ C. of 100 $mm^2$/sec to 2500 $mm^2$/sec and having a vapor pressure at 50° C. of $5 \times 10^{-5}$ Torr or less. Also, in this case, it is more desirable for the base oil to consist of a liquid fluorinated polymer having a kinetic viscosity at $-20°$ C. of 100 mm²/sec to 2000 mm²/sec and having a vapor pressure at 50° C. of $2 \times 10^{-5}$ Torr or less. By using the particular liquid fluorinated polymer, the effects described above are rendered more prominent.

The base oil used in the lubricant described above, which is not particularly limited as far as the base oil consists of a liquid fluorinated polymer having the kinetic viscosity and the vapor pressure described above, includes, for example, perfluoropolyether (hereinafter referred to as "PFPE"), telomer of trifluoroethylene, and fluorosilicone polymer. These liquid fluorinated polymer oils can be used singly or in combination.

In the first embodiment of the present invention, it is possible for the lubricant to contain as a thickening agent substances such as a solid fluorinated polymer, an layered mineral powder, ultra fine particles, and a white powder substantially all the constituents there of being nonmetal elements.

The solid fluorinated polymer used as a thickening agent includes, for example, polytetrafluoroethylene (hereinafter referred to as "PTFE"), a copolymer of tetrafluoroethylene and hexafluoropropene, a copolymer of tetrafluoroethylene and perfluoropropyl vinyl ether, and a mixture of these polymers.

The layered mineral powder used as the thickening agent in the present invention includes, for example, powders of a mica series mineral, a vermiculite series mineral and a montmorillonite series mineral each having a layered crystal structure such as that of a graphite or a hexagonal system boron nitride.

The chemical composition of the mica series mineral can be represented by a general formula $XMg_2Li(Y_4O_{10})z_2$ or $XMg_{2.5}(Y_4O_{10})z_2$. The chemical composition of the vermiculite series mineral can be represented by a general formula $X_{2/3}Mg_{7/3}Li_{2/3}(Y_4O_{10})Z_2$. Further, the chemical composition of the montmorillonite series mineral can be represented by a general formula $X_{1/3}Mg_{8/3}Li_{1/3}(Y_4O_{10})z_2$. Incidentally, X in these general formulas represents K, Na or Li. Y represents Si or Ge. Further, Z represents F or OH.

The physical properties common with these layered mineral will now be described with mica taken up as an example. The main component of mica is $SiO_2$, which is contained in an amount of 40 to 50%. The Si atoms in the mica crystal are coordinated to the oxygen tetrahedron and the Si—$O_4$ bond is very strong. The mica crystal is of a layered structure in which sandwich layers each called a tablet are laminated one upon the other, said sandwich layer consisting of a pair of layers each formed of the tetrahedrons and ions capable of forming an octahedral coordination such as $Al^{3+}$, $Fe^{2+}$ and $Mg^{2+}$ and arranged between the pair of layers. An alkali metal ion or an alkaline earth metal ion, which is called an interlayer ion, is arranged between the adjacent tablets, and the interlayer ion forms an ionic bond with an oxygen atom. However, the ionic bond between the interlayer ion and the oxygen atom is very weak, with the result that mica tends to be peeled from the plane formed by the interlayer ions.

As described above, the bonding strength between adjacent tablets is weak in the layered mineral described above and, thus, if a shearing stress is applied to the particular mineral, the mineral is easily cleaved at the plane formed by the interlayer ions. It follows that, in the case of using the layered mineral as a thickening agent contained in the lubricant, the friction coefficient is lowered in the rolling contact surface and the sliding contact surface of the rolling body, the movable body and the support member. In other words, the abrasion at the contact surface is suppressed and it is possible to prevent an increase in the torque and the seizing.

It is desirable for the layered mineral to contain at least one of lithium ions and sodium ions as the interlayer ions. If the mica series mineral, the vermiculite series mineral or the montmorillonite series mineral, each containing an interlayer ion having a small ion radius, is mixed with a solvent such as water or an oil, the solvent enters the clearance between the crystal layers so as to permit the mineral to be swollen.

Where the lubricant is prepared by mixing the layered mineral powder having such swelling properties with a base oil, the base oil is partly taken into the layered mineral powder. It follows that, in the case of using the particular lubricant, the base oil can be supplied to the contact surface if the base oil is deficient in the contact surface. On the other hand, where the base oil is present excessively on the contact surface, the base oil can be taken into the layered mineral powder. As a result, an appropriate amount of the base oil is kept supplied to the contact surface. It follows that it is possible to obtain a satisfactory torque life and to prevent effectively the base oil from being scattered during operation of the rolling device.

It is desirable for the interface of the layered mineral powder to be subjected to a hydrophobic treatment with a hydrophobic surfactant. By making the interface hydrophobic, it is possible to prevent water from being taken into the layered mineral powder and to take the base oil into the layered mineral powder selectively and efficiently. It follows that it is possible to maintain a satisfactory lubricating state over a long period of time, to improve the torque life of the rolling device, and to suppress the contamination of the outer environment more satisfactorily.

The hydrophobic surfactant used for the hydrophobic treatment is not particularly limited in the present invention as far as the hydrophobic surfactant has an alkyl group having at least 8 carbon atoms. Specifically, it is possible to use ammonium salt compounds and alkyl amine series surfactants having a functional group such as —$NH_2$ group, —OH group, and —COOH group.

It is desirable for the layered mineral powder to have an average particle diameter falling within a range of between 0.05 μm and 20 μm, preferably between 0.1 μm and 10 μm. Where the average particle diameter is smaller than the lower limit of the range described above, the powder particles are agglomerated when the powder is mixed with the base oil for preparation of the lubricant so as to form secondary particles, leading to a low dispersion capability. On the other hand, where the average particle diameter exceeds the upper limit of the range described above, it is difficult for the layered mineral powder particles to enter the rolling contact surface or the sliding contact surface. Alternatively, the contact surfaces bite the powder particles. It follows that the torque of the rolling device is marked increased. In some cases, it is possible for the rolling device to be made inoperable.

The ultra fine particles used as a thickening agent in the lubricant of the present invention has a small particle diameter and a roundish surface shape. In the case of using a lubricant containing such ultra fine particles, a so-called "micro bearing effect" is produced such that the ultra fine particles are allowed to roll on the rolling contact surface and the sliding contact surface of the rolling body, the movable member and the support member. As a result, the friction coefficient is lowered on the contact surface. Also, where a large load is applied, it is possible to prevent the agglutination between the rolling contact surfaces or between the sliding contact surfaces in the cases where the rolling device is operated at a low speed and where the base oil is deficient between the adjacent contact surfaces. It follows that it is possible to prevent abrasion and seizing of the contact surface so as to maintain a satisfactory lubricating state over a long period of time.

It is possible for the ultra fine particles to consist of either an inorganic substance or an organic compound. The ultra fine particles formed of an inorganic substance include inorganic compound particles such as $SiO_2$ fine particles, MgO fine particles, $TrO_2$ fine particles and $Al_2O_3$ fine particles; and inorganic materials consisting of carbon alone such as diamond fine particles and fullerene ($C_{60}$). These inorganic substances can be formed into very small particles having roundish surfaces. Among these ultra fine particles, it is desirable to use diamond fine particles or fullerene ($C_{60}$).

The diamond fine particles are very stable chemically and are very hard and, thus, are unlikely to be broken. Where the ultra fine particles are broken, the broken particles tend to have sharp corner portions or tend to form sharp particles. On the other hand, in the case of using diamond fine particles as the ultra fine particles, it is substantially impossible for the broken piece, even if the diamond particles are broken, to have a sharp corner portion or to form a sharp piece. It follows that a good lubricating state can be maintained for a long period of time.

Further, in this case, it is more desirable for the surfaces of the diamond fine particles to be chemically coated with graphite. The graphite coating applied to the surface serves to improve the boundary lubricity of the ultra fine particles, making it possible to maintain a good lubricating state for a further longer period of time.

A good lubricating state can also be maintained for a long time in the case of using fullerene ($C_{60}$), too. It should be noted in this connection that fullerene ($C_{60}$) is a molecule consisting of 60 carbon atoms and shaped like a soccer ball having a closed shell structure consisting of a plurality of six-membered rings and five-membered rings contiguous to each other. It is known to the art that fullerene ($C_{60}$) is highly stable against heat so as not to be broken up to 1500° C. Also, since fullerene ($C_{60}$) has a spherical molecular structure, the micro bearing effect referred to previously can be produced more prominently. Further, fullerene ($C_{60}$) itself exhibits a lubricity. It follows that, where fullerene ($C_{60}$) is used as ultra fine particles, a good lubricating state can be maintained over a long period of time.

It is desirable for the ultra fine particles consisting of an inorganic substance to have an average particle diameter not larger than 0.1 $\mu$m. Where the average particle diameter exceeds 0.1 $\mu$m, it is difficult for the ultra fine particles to enter the rolling contact surface or the sliding contact surface. Alternatively, the contact surfaces tend to bite the ultra fine particles. It should also be noted that the ultra fine particles produce a polishing function, with the result that the surface roughness is increased in a relatively short time, or the abnormal abrasion tends to be generated in some cases. It follows that the torque of the rolling device is markedly increased so as to make the rolling device inoperable in some cases.

Incidentally, the layered mineral powder is shaped like a scale having a thickness smaller than the average diameter. Also, since the layered mineral powder tends to be cleaved and is soft, the layered mineral powder is capable of entering the space between adjacent contact surfaces, though the layered mineral powder has an average diameter of 0.1 to 10 $\mu$m. In addition, the contact surface is not scratched by the layered mineral powder. However, since the ultra fine particles consisting of the inorganic substances described above are shaped spherical, it is difficult for the particles having an average particle diameter exceeding 0.1 $\mu$m, i.e., particles having a diameter larger than the thickness of the oil film interposed between adjacent contact surfaces, to enter the clearance between adjacent contact surfaces. Also, since the ultra fine particles are hard, the particles having an average particle diameter exceeding 0.1 $\mu$m tend to abrade the contact surface. It follows that the layered mineral powder and the ultra fine particles consisting of inorganic substances differ from each other in a desired range of the particle diameter.

On the other hand, the ultra fine particles consisting of organic compounds, i.e., organic ultra fine particles, are ultra fine polymer particles prepared by the known technology such as an emulsion polymerization, a multi-stage emulsion polymerization, a suspension polymerization and NAD (Non-Aqueous Dispersion). The ultra fine polymer particles used in the present invention include, for example, particles of polymer or copolymer of acrylic ester represented by the general formula $CH_2=CHCOOR$ such as methyl acrylate, ethyl acrylate, 2-ethyl hexyl acrylate, and n-butyl acrylate; particles of polymer or copolymer of a methacrylic ester represented by the general formula $CH_2=C(CH_3)COOR$ such as ethyl methacrylate, glycidyl methacrylate, cyclohexyl methacrylate, hydroxyethyl methacrylate, n-butyl methacrylate, hexyl methacrylate and methyl methacrylate; particles of styrene polymer; particles of styrene-acryl series copolymer; and particles of styrene-methacrylic ester copolymer.

In the case of using a lubricant containing such organic ultra fine particles, the organic ultra fine particles are present between the adjacent rolling contact surfaces and between the adjacent sliding contact surfaces of the movable member, the support member and the rolling body. Therefore, even if the lubricating oil or grease is insufficient, these members are prevented from being brought into direct contact with each other.

It should be noted that the organic ultra fine particle is a so-called "microgel", which is an intramolecular crosslinked high molecular weight compound having an internal three-dimensional network. The organic ultra fine particle of the particular structure is very soft, compared with the materials forming the movable member, the support member, the rolling body, etc. It follows that that the organic ultra fine particles do not damage the members of the rolling device. In other words, abrasion of these members are not promoted.

It should also be noted that the organic ultra fine particles used in the present invention have a crosslinked structure as already pointed out. Therefore, when mixed with various solvents, these organic ultra fine particles are not dissolved in the solvent. By contraries, the solvent is taken into the crosslinked structure so as to cause the organic ultra fine particles to be swollen. Where the lubricant consists of a base oil and the organic ultra fine particles, the base oil is partly taken into the organic ultra fine particles exhibiting the swelling properties. It follows that, where the base oil is deficient on the contact surface, the base oil can be supplied from the organic ultra fine particles. On the other hand, where an excessively large amount of the base oil is present on the contact surface, the excess base oil is taken into the organic ultra fine particles. It follows that an appropriate amount of the base oil is kept supplied to the contact surface, making it possible to prevent effectively the base oil from being scattered during operation of the rolling device.

Incidentally, the organic ultra fine particles used in the present invention are shaped spherical in general. Where the organic ultra fine particles are shaped spherical, a micro bearing effect is produced by the rolling of the organic ultra fine particles on the surface of the member of the rolling device so as to decrease the frictional resistance on the rolling contact surface and the sliding contact surface. It follows that it is possible to prevent effectively the change in the torque and the seizing, making it possible to maintain a good lubricating state for a further long period of time.

It is desirable for the organic ultra fine particles to be hydrophobic. If the organic ultra fine particles are made hydrophobic, it is possible to prevent the organic ultra fine particles from taking in water and for the organic ultra fine particles to take in the base oil selectively and efficiently. It follows that a good lubricating state can be maintained for a longer period of time and the torque life of the rolling device can be improved. In addition, it is possible to suppress sufficiently the contamination of the outer environment.

It is possible to modify the surface of the organic ultra fine particles with a functional group such as a —$NH_2$ group, a —OH group or a —COOH group or with a polymerizable C=C group. It is also possible to modify the surface of the organic ultra fine particles with a polymer chain formed of, for example, a polymerizable C=C group and, further, to apply a grafting treatment to the polymer chain. By applying the particular treatment to the surface of the organic ultra fine particle, the dispersion capability in, for example, the base oil can be stabilized. In addition, the adsorption capability on the surface of the members of the rolling device is improved. It follows that a good lubricating state can be maintained for a longer period of time.

Further, it is desirable for the organic ultra fine particles to be white. In this case, even if the lubricant is scattered, the outer environment of the rolling device is not colored black.

It is desirable for the organic ultra fine particles to have an average particle diameter falling within a range of between 20 nm and 1 μm. Where the average particle diameter is smaller than the lower limit of the range noted above, the powder particles are agglomerated in some cases to form secondary particles when the organic ultra fine particles are mixed with the base oil to prepare a lubricant, with the result that the dispersion capability of the organic ultra fine particles is lowered. On the other hand, where the average particle diameter exceeds the upper limit of the range noted above, it is difficult for the organic ultra fine particles to enter the rolling contact surface or the sliding contact surface. Alternatively, the contact surfaces bite the organic ultra fine particles so as to markedly increase the torque of the rolling device, with the result that the rolling device is rendered inoperable in some cases.

It is possible to use as a thickening agent a white powder consisting of a nonmetal element in respect of substantially all the constituents of the white powder. In this case, even if the lubricant is scattered, the white powder does not color black the outer environment of the rolling device. Also, since a metal element is not contained in the white powder, a defect or an electrical short circuiting is not generated even if the white powder is attached to, for example, a semiconductor substrate.

It should also be noted that, even where the base oil is deficient in the rolling contact surface and the sliding contact surface of the rolling body, the movable member and the support member, the contact surfaces are prevented from being brought into direct contact with each other because the white powder is interposed between the adjacent contact surfaces. In other words, the abrasion and seizing of the contact surfaces are prevented so as to ensure a good lubricating state over a long period of time.

As the materials used for preparing the white powder contained in the thickening agent, it is possible to use compounds having a layered crystal structure such as an amino acid compound, melamine cyanurate (MCA) and carbon fluoride.

The amino acid compound having a layered crystal structure includes, for example, N-lauroyl.L-lysine having a chemical formula (1) given below:

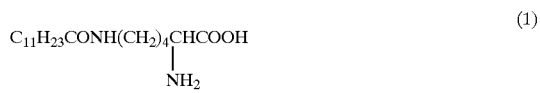

(1)

N-lauroyl.L-lysine having a chemical formula (1) given above has a lamellar structure and, thus, is cleaved easily.

Melamine cyanurate (MCA) consists of a melamine molecule and a cyanuric acid molecule. These melamine molecule and cyanuric acid molecule strongly bonded to each other by hydrogen bond so as to form a planar layer. A powder made of melamine cyanurate has a laminate structure consisting of the planar layers noted above, which are laminated one upon the other with a weak bonding force such as Van der Waals force. In other words, a powder of melamine cyanurate has a lamellar structure like, for example, graphite and, thus, can be cleaved easily.

Carbon fluoride is a compound represented by a general formula $(CF)_n$ or $(CF_2)_n$, which can be easily obtained by fluorinating a carbon source by using a fluorinating agent such as a fluorine gas. The carbon source, which is not particularly limited in the present invention, can be provided by, for example, a crystalline graphite or an amorphous carbon. It is possible for the carbon fluoride to contain a material that is not completely fluorinated. In other words, it is possible for the unreacted carbon to remain within the carbon fluoride.

Any of the materials having a layered crystal structure such as the amino acid compound, melamine cyanurate (MCA), carbon fluoride, fluorinated graphite, fluorinated pitch and hexagonal boron nitride (hBN) has a lamellar structure that can be easily cleaved like graphite. Therefore, in the case of using these compounds as the white powder, the white powder present between adjacent contact surfaces is cleaved so as to decrease the friction coefficient even in the case where the base oil is deficient in the rolling contact surface and the sliding contact surface of the rolling body, the movable member and the support member. In other words, by using the white powder consisting of these compounds, abrasion of the contact surface can be decreased, and it is possible to prevent an increase in the torque and seizing.

It is desirable for the white powder to have an average particle diameter falling within a range of between 0.05 μm and 20 μm. Where the average particle diameter is smaller than the lower limit of the range noted above, the powder particles are agglomerated in some cases to form secondary particles when the white powder particles are mixed with the base oil to prepare a lubricant, with the result that the dispersion capability of the organic ultra fine particles is lowered. On the other hand, where the average particle diameter exceeds the upper limit of the range noted above, it is difficult for the white powder particles to enter the rolling contact surface or the sliding contact surface. Alternatively, the contact surfaces bite the white powder particles so as to markedly increase the torque of the rolling device, with the result that the rolling device is rendered inoperable in some cases.

The solid fluorinated polymer, the layered mineral powder, the ultra fine particles, and the white powder substantially all the components thereof being nonmetal elements can be used as a thickening agent singly or in the form a mixture of a plurality of materials. Also, where the thickener is contained in the lubricant in the first embodiment of the present invention, the concentration of the thickener based on the lubricant should be 10 to 45% by weight, preferably 15 to 40% by weight, and most preferably 20 to 35% by weight. Where the concentration of the thickener falls within the range noted above, the particular effect of the present invention can be produced more prominently.

The lubricant used in the rolling device according to the second embodiment of the present invention will now be described.

The lubricant used in the rolling device according to the second embodiment of the present invention, which permits the rolling device to be driven satisfactorily under a high temperature, high speed or vacuum condition, contains as a base oil a liquid fluorinated polymer oil having a kinetic viscosity at 40° C. falling within a range of between 10 $mm^2/sec$ and 400 $mm^2/sec$ and having a kinetic viscosity at 100° C. falling within a range of between 3 $mm^2/sec$ and 80 $mm^2/sec$.

Where the kinetic viscosity at 40° C. of the liquid fluorinated polymer oil is less than 10 $mm^2/sec$ or where the kinetic viscosity at 100° C. of the liquid fluorinated polymer oil is less than 3 $mm^2/sec$, the liquid fluorinated polymer oil tends to leak from the rolling device. As a result, the amount of the lubricant becomes deficient, or a formation of an oil film on the rolling contact surface or the sliding contact surface becomes insufficient, with the result that the rolling body is brought into direct contact with each of the rolling body and the support member. In other words, it is difficult to suppress the contamination of the outer environment and to obtain a sufficient torque life.

On the other hand, where the kinetic viscosity at 40° C. of the liquid fluorinated polymer oil is higher than 400 $mm^2/sec$ or where the kinetic viscosity at 100° C. of the liquid fluorinated polymer oil is higher than 80 $mm^2/sec$, the resistance of the lubricant to stirring becomes excessively high. As a result, the torque of the rolling device is increased so as to increase the loss of power of the motor, etc. Also, since the amount of heat generation accompanying the driving of the rolling device is increased, the evaporation of the lubricant is promoted. In other words, it is difficult to suppress the contamination of the outer environment and to obtain a sufficient torque life.

On the other hand, in the case of using as a base oil a liquid fluorinated polymer oil having a kinetic viscosity at 40° C. falling within a range of between 10 $mm^2/sec$ and 400 $mm^2/sec$ and having a kinetic viscosity at 100° C. falling within a range of between 3 $mm^2/sec$ and 80 $mm^2/sec$, it is possible to suppress leakage and evaporation of the lubricant and to prevent the torque from being increased. In other words, it is possible to suppress the contamination of the outer environment and to obtain a sufficient torque life even under the high temperature, high speed or vacuum condition.

In the second embodiment of the present invention, it is desirable to use as a base oil a liquid fluorinated polymer oil having a kinetic viscosity at 40° C. falling within a range of between 13 $mm^2/sec$ and 320 $mm^2/sec$ and a kinetic viscosity at 100° C. falling within a range of between 4 $mm^2/sec$ and 60 $mm^2/sec$. It is more desirable to use as a base oil a liquid fluorinated polymer oil having a kinetic viscosity at 40° C. falling within a range of between 15 $mm^2/sec$ and 270 $mm^2/sec$ and a kinetic viscosity at 100° C. falling within a range of between 5 $mm^2/sec$ and 50 $mm^2/sec$. In the case of using a liquid fluorinated polymer oil meeting these requirements, the particular effect of the present invention can be produced more prominently.

The base oil used in the lubricant described above, which is not particularly limited as far as the base oil consists of a liquid fluorinated polymer oil having the kinetic viscosity described above, includes, for example, perfluoropolyether (hereinafter referred to as "PFPE"), telomer of trifluoroethylene, and fluorosilicone polymer. These liquid fluorinated polymer oils can be used singly or in combination.

In the second embodiment of the present invention, it is possible for the lubricant to contain a thickening agent similar to that described previously in conjunction with the first embodiment. Incidentally, in the second embodiment of the present invention, not only the kind of the thickening agent contained in the lubricant but also the concentration of the thickening agent in the lubricant are similar to those described previously in conjunction with the first embodiment.

In the second embodiment of the present invention, it is possible for the lubricant to contain an oily compound. The term "oily compound" represents an organic compound having a perfluoropolyether skeleton as a backbone chain, with a polar group in at least one end, and having a molecular weight not higher than 10,000.

Since the oily compound has a skeleton similar to that of the liquid fluorinated polymer oil, the oily compound is easily dissolved in the base oil and is not separated. Also, since the oily compound has a low vapor pressure, the amount of evaporation under a vacuum condition is very small.

Further, the oily compound has a substituent group having a high polarity at the terminal of the backbone chain and, thus, is easily adsorbed on the metal surface. In other words, the oily compound is easily adsorbed physically and chemically on the rolling contact surface and the sliding contact surface of the rolling body, the movable member and the support member. Thus, even where the base oil is deficient on the contact surface, the contact surfaces are prevented from being brought into direct contact with each other. It follows that, according to the rolling device of the second embodiment, the friction coefficient of the contact surface is lowered, with the result that it is possible to prevent the abrasion and seizing of the contact surface and to prevent the torque from being increased.

The oily compound used in the present invention has a molecular weight not higher than 10,000. Where the molecular weight of the oily compound exceeds 10,000, the adsorption capability of the oily compound on the rolling contact surface and the sliding contact surface is lowered, resulting in failure to obtain the effect of improving the lubricity in some cases.

It is desirable for the oily compound to be contained in an amount of 0.5 to 10% by weight based on the amount of the lubricant. Where the concentration of the oily compound is lower than the lower limit of the range noted above, it is impossible in some cases to obtain the effects of improving the lubricity and of suppressing the leakage and scattering of the lubricant. On the other hand, if the concentration of the oily compound exceeds the upper limit of the range noted above, the viscosity of the lubricant is lowered. In this case, the scattering and leakage of the lubricant tend to be generated easily.

In the second embodiment of the present invention, the compounds represented by general formulas (2) to (5) given below can be used as the oily compound. In general formulas (2) to (5) given below, m and n represent positive integers:

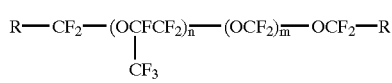 (2)

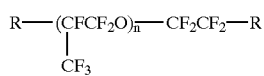 (3)

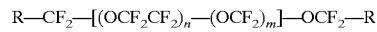 (4)

 (5)

In the compounds represented by the general formulas (2) to (5) given above, at least one substituent R represents a polar group such as a carboxyl group (—COOH), an alcohol group and an isocyanate group. Also, the alcohol group and the isocyanate group can have chemical structures (6) to (9) given below;

 (6)

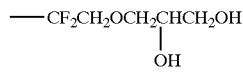 (7)

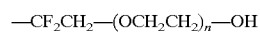 (8)

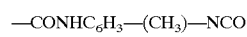 (9)

Where the two substituents R represent polar groups such as a carboxyl group, an alcohol group and an isocyanate group, it is possible for these two substituents R to be the same or different. Also, where only one of these two substituents R is a polar group such as a carboxyl group, an alcohol group or an isocyanate group, it is desirable for the other substituent R to be a fluorine atom.

In each of the rolling devices according to the first and second embodiments of the present invention, it is possible to mix various additives in addition to the thickening agents, etc. described above with the lubricant as far as the particular effects of the present invention described above are not impaired. The additives mixed with the lubricant include, for example, an antioxidant, a rust inhibitor, an abrasion inhibitor, a dispersant, a metal protector and a surfactant. The upper limit of the addition amount, which differs depending on the kind of the additive, should be about 15% by weight in terms of the sum of all the additives.

The lubricant used in the rolling device according to the third embodiment of the present invention will now be described.

The lubricant used in the rolling device according to the third embodiment of the present invention is a grease composition containing a mixture of a liquid fluorinated polymer oil used as a base oil and a thickening agent. The liquid fluorinated polymer oil should have a kinetic viscosity at 40° C. of 10 mm$^2$/sec to 400 mm$^2$/sec.

The rolling device according to the second embodiment of the present invention is adapted for use under high temperature, high speed, or vacuum condition and, thus, it is desirable for the rolling device not to contaminate the outer environment. On the other hand, the rolling device according to the third embodiment of the present invention is adapted for use under high temperature, high speed and heavy load condition.

Where the demands for measures for preventing the outer environment from being contaminated are not so severe, and the use under a vacuum condition is not taken into account, it is unnecessary to take the kinetic viscosity at 100° C. of the base oil under the vacuum condition into consideration as in the second embodiment. To be more specific, the sole condition required for the liquid fluorinated polymer oil is that the kinetic viscosity at 40° C. should fall within a range of between 10 mm$^2$/sec and 400 mm$^2$/sec. By using as a lubricant a grease composition containing a mixture of a base oil consisting of a liquid fluorinated polymer oil and a thickening agent, it is possible to achieve a rolling device adapted for use under high temperatures, high operating speed and heavy load condition.

In the third embodiment of the present invention, the base oil used in the lubricant is not particularly limited as far as a liquid fluorinated polymer oil having the kinetic viscosity noted above is used as the base oil. However, it is desirable to use the compounds represented by the general formulas (10) and (11) given below. Incidentally, in the general formulas (10) and (11), m and n represent positive integers. Also, m and n in general formula (10) meets the inequality m/n>40.

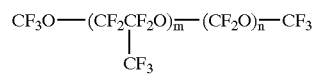 (10)

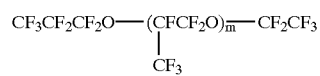 (11)

In the third embodiment of the present invention, the viscosity at 40° C. of the fluorinated polymer oil should fall within a range of between 10 mm$^2$/sec and 400 mm$^2$/sec, preferably between 13 mm$^2$/sec and 320 mm$^2$/sec, and more preferably between 15 mm$^2$/sec and 270 mm$^2$/sec. If the viscosity of the fluorinated polymer oil at 40° C. exceeds 400 mm$^2$/sec, a resistance to stirring is increased so as generate a large amount of heat. As a result, the members constituting the rolling device are expanded and the clearance among these members is diminished so as to bring about an abnormal abrasion and seizing in some cases. Also, if the viscosity of the fluorinated polymer oil at 40° C. lower than 10 mm$^2$/sec, it is impossible to form a sufficient oil film to bring the metal members into direct contact with each other, thereby giving rise to seizing in some cases.

In the third embodiment of the present invention, it is possible to use, for example, PTFE as a thickening agent. It is possible for the shape of the thickening agent to be spherical, polyhedral such as cubic or rectangular parallelepiped, or a needle-like in extreme cases. It is desirable to control the addition amount of the thickening agent such that the viscosity of the grease composition has a grade Nos. 1 to 3 as defined in NLGI.

In the third embodiment of the present invention, it is possible for the grease composition to contain layered mineral powder having an average particle diameter of 0.05 μm to 20 μm, ultra fine particles having an average particle diameter of 0.02 μm to 1 μm, or a layered nonmetal powder having an average particle diameter of 0.05 μm to 20 μm. These additives may be added singly to the grease composition or may added in the form of a mixture of at least two of these materials.

It is desirable for the additives used in the third embodiment of the present invention to meet the requirements given below:

(1) The surface of the additive should be made hydrophobic by the treatment with a hydrophobic surfactant.

(2) The additive should contain at least one kind of a layered mineral powder selected from the group consisting of a mica series mineral powder, a vermiculite series mineral powder, and a montmorillonite series mineral powder.

(3) The additive should contain a layered mineral powder containing at least one of lithium ions and sodium ions as interlayer ions.

(4) The additive should contain at least one ultra fine particles selected from the group consisting of inorganic ultra fine particles and organic ultra fine particles.

(5) The additive should contain at least one kind of inorganic ultra fine particles selected from the group consisting of diamond (CD) fine particles, diamond fine particles having the surface formed of graphite, fullerene ($C_{60}$), $SiO_2$ fine particles, $TiO_2$ fine particles, ZrO fine particles and MgO fine particles.

(6) The additives should contain ultra fine particles consisting of an inorganic substance having an average particle diameter not larger than 0.1 μm.

(7) The additive should contain organic ultra fine particles consisting of a polymer having a three-dimensional network.

(8) The additive should contain organic ultra fine particles having swelling properties in the presence of a base oil.

(9) The additive should contain spherical organic ultra fine particles.

(10) The additive should contain organic ultra fine particles having an average particle diameter of 20 nm to 1 μm.

(11) The additive should contain at least one kind of layered metal powder selected from the group consisting of an amino acid compound such as N-lauroyl.L-lysine, melamine cyanurate (MCA), carbon fluoride, fluorinated pitch, fluorinated graphite and hexagonal boron nitride (hBN).

In the third embodiment of the present invention, the grease composition is prepared, for example, as follows. In the first step, a thickening agent is added to a base oil and the mixture is stirred while applying heating so as to obtain a semi-solid mixture. After the resultant mixture is gradually cooled, an additive is added to the mixture and the resultant mixture is uniformly blended with, for example, a roll mill, thereby obtaining a grease composition used in the third embodiment of the present invention. The heating temperature, the stirring time, the blending time, etc. in preparation of the grease composition are determined appropriately in view of the kind and amount of the base oil, the thickening agent and the additive used.

Examples of the present invention will now be described.

EXAMPLE 1

This example is directed to a ball-and-roller bearing adapted for use under low temperature conditions.

FIG. 1 is a cross sectional view showing a ball-and-roller bearing 1 according to examples of the present invention. As shown in the drawing, the ball-and-roller bearing 1 comprises an inner ring 2 having a groove-like track formed along the outer circumferential surface, an outer ring 3 having a groove-like track formed in the inner circumferential surface and arranged concentric with the inner ring 2, and a ball 4, which is a rolling body, arranged to be capable rolling along the tracks of the inner ring and the outer ring 3. The ball 4 is held by a holder 5, and a lubricant 6 is housed between the inner ring 2 and the outer ring 3 so as to decrease the contact resistance of the inner ring 2, the outer ring 3 and the ball 4. A reference numeral 7 shown in the drawing represents a shield plate.

The torque life of the ball-and-roller bearing 1 was examined by changing the composition of the lubricant 6 in various fashions. Specifically, a ball bearing (Type No. 688) having an inner diameter of 8 mm, an outer diameter of 16 mm, and a width of 4 mm, which was manufactured by Nippon Seiko K.K., was used as the ball-and-roller bearing 1, and the torque life was examined by using a bearing rotation tester manufactured by Nippon Seiko K.K. Incidentally, the torque life, which denotes the rotating time ranging between the start-up of the operation and the time when the torque value is rapidly increased, was measured under the conditions given below:

Temperature: −20° C., 50° C.

Atmosphere: He gas flow

Rotating speed: 3000 rpm

Axial load: 196N

Radial load: 1.96N

In order to evaluate the degree of contamination of the outer environment (e.g., coolant) caused by the evaporation of the lubricant 6, the amount of loss by evaporation of the lubricant 6 was examined by measuring the total weight of the ball-and-roller bearing 1 both before and after the test.

Tables 1 and 2 show the materials used as the base oil and the thickening agent of the lubricant 6. Also, Table 3 shows the amounts of the materials except Fe used for forming the inner ring 2, the outer ring 3 and the rolling body 4 used in this Example. The material ES-1 shown in Table 3 represents 13Cr martensite series stainless steel characterized in that three elements of C, Cr and N are contained.

Table 4 shows the materials of the inner ring 2, the outer ring 3, the rolling body 4 and the lubricant 6, the torque life obtained by the method described above, and the amount of loss caused by evaporation. Incidentally, in Table 4, the concentration of the solid fluorinated polymer [1] contained in the lubricant used in each of samples (1) to (22) and comparative samples (1) and (2) was 20% by weight, and the addition amount of the thickening agent other than the solid fluorinated polymer [1] was 3% by weight in each of the samples and the comparative samples noted above. Also, in Table 4, the torque life is indicated by a relative value obtained in the case where the rotating time obtained in respect of comparative sample (1) is set at 1. Also, the amount of loss caused by evaporation is indicated in Table 4 by a relative value obtained in the case where the amount of the weight reduction of the lubricant 6 obtained in respect of comparative sample (1) is set at 100.

TABLE 1

| Base oil (liquid fluorinated polymer oil) | | | Kinetic viscosity at -20° C. (mm²/sec) | Vapor pressure at 50° C. (Torr) |
|---|---|---|---|---|
| PFPE oil | <1> | S-65 | 1800 | $2 \times 10^{-6}$ |
| | <2> | S-20 | 500 | $1 \times 10^{-5}$ |
| | <3> | S-100 | 2000 | $1 \times 10^{-9}$ |
| | <4> | Z03 | 170 | $1 \times 10^{-4}$ |
| | <5> | Z15 | 600 | $9 \times 10^{-7}$ |
| | <6> | Z25 | 1000 | $3 \times 10^{-11}$ |
| | <7> | IEL/V | 2000 | $3 \times 10^{-6}$ |
| | <8> | Z60 | 2500 | $1 \times 10^{-13}$ |
| | <9> | S-200 | 5000 | $1 \times 10^{-9}$ |
| | <10> | J60V | 5000 | $8 \times 10^{-5}$ |

TABLE 2

| Thickening agent | | |
|---|---|---|
| [1] | Solid fluorinated polymer | "Lubron L-5", PTFE resin powder manufactured by Daikin Kogyo K.K. |
| [2] | Layered mineral powder | Synthetic mica 4C-TS synthesized by Topy Kogyo K.K., average particle diameter of 3 μm |
| [3] | Diamond fine particle | MYPOMEX manufacture by Du Pont |
| [4] | Fullerene | Pure C60 manufactured by Materials and Electrochemical Research Inc. |
| [5] | Organic ultra fine particles | Nippe Microgel P1800 manufactured by Japan Paint K.K. |
| [6] | Amino acid compound | Famex L-12J manufactured by Ajinomoto K.K., average particle diameter of 3 μm |
| [7] | MCA | Melamine cyanurate manufactured by Mitsubishi Chemical Co., Ltd, average particle diameter of 2 μm |
| [8] | Fluorinated pitch | Fluorinated pitch manufactured by Osaka Gas K.K., average particle diameter of 1 μm |
| [9] | hBN | Hexahedral boron nitride. GP manufactured by Denki Kagaku Kogyo K.K., average particle diameter of 2 μm |

| Oily compound | | |
|---|---|---|
| [10] | Perfluoropolyether series carboxylic acid SH, manufactured by Daikin Kogyo K.K., average molecular weight of 3600 | |

TABLE 3

| | C | Si | Mn | P | S | Ni | Cr |
|---|---|---|---|---|---|---|---|
| ES1 | 0.44–0.46 | 0.20–0.40 | 0.20–0.40 | 0.030 or less | 0.010 or less | 0.30 or less | 12.8–13.2 |
| LNS125 | 0.60–0.70 | 1.00 or less | 1.00 or less | 0.030 or less | 0.010 or less | 0.30 or less | 12.0–13.5 |
| SUS440C | 0.95–1.20 | 0.10 or less | 1.00 or less | 0.040 or less | 0.030 or less | 0.60 or less | 16.0–18.0 |
| SUJ2 | 0.95–1.10 | 0.15–0.35 | 0.50 or less | 0.025 or less | 0.025 or less | 0.25 or less | 1.3–1.6 |

| | Mo | Cu | V | Ti | O | N | Others |
|---|---|---|---|---|---|---|---|
| ES1 | 0.25 or less | 0.25 or less | 0.15 or less | 50 ppm or less | 20 ppm or less | 0.09–0.18 | C + N 0.05 or more |
| LNS125 | 0.25 or less | 0.25 or less | 0.15 or less | 50 ppm or less | 20 ppm or less | — | — |
| SUS440C | 0.75 or less | 0.25 or less | — | — | — | — | — |
| SUJ2 | 0.08 or less | 0.25 or less | — | — | 15 ppm or less | — | — | unit: % by weight (excluding Ti and O)

TABLE 4

| | | Material | | Lubricant | | Torque life | | Loss by evaporation | |
|---|---|---|---|---|---|---|---|---|---|
| | | Inner ring · outer ring | Rolling body | Base oil | Thickening agent | -20° C. | 50° C. | -20° C. | 50° C. |
| Sample | (1) | SUJ2 | SUJ2 | <1> | [1] | 20 | 30 | 10 | 15 |
| | (2) | ES1 | ES1 | <1> | [1] | 40 | 50 | 10 | 13 |

TABLE 4-continued

| | | Material | | Lubricant | | Torque life | | Loss by evaporation | |
|---|---|---|---|---|---|---|---|---|---|
| | | Inner ring · outer ring | Rolling body | Base oil | Thickening agent | −20° C. | 50° C. | −20° C. | 50° C. |
| | (3) | SUJ2 | ES1 | <2> | [1] | 25 | 30 | 15 | 20 |
| | (4) | SUJ2 | SUS440C | <3> | [1] | 30 | 50 | 10 | 18 |
| | (5) | SUS440C | SUJ2 | <4> | [1] | 20 | 10 | 20 | 30 |
| | (6) | SUS440C | SUS440C | <5> | [1] | 50 | 65 | 6 | 6 |
| | (7) | ES1 | SUJ2 | <6> | [1] | 40 | 70 | 5 | 3 |
| | (8) | ES1 | ES1 | <7> | [1] | 35 | 45 | 10 | 15 |
| | (9) | ES1 | SUJ2 | <8> | [1] | 25 | 40 | 10 | 15 |
| | (10) | ES1 | $Si_3N_4$ | <1> | [1] | 200 | 230 | 5 | 8 |
| | (11) | SUJ2 | SUJ2 | <1> | [1] + [2] | 120 | 130 | 8 | 10 |
| | (12) | ES1 | ES1 | <1> | [1] + [2] | 210 | 225 | 5 | 8 |
| | (13) | SUJ2 | $Si_3N_4$ | <6> | [1] + [2] | 300 | 320 | 3 | 5 |
| | (14) | ES1 | $ZrO_2$ | <7> | [1] + [2] | 320 | 335 | 5 | 7 |
| | (15) | SUS440C | SUS440C | <1> | [1] + [3] | 280 | 300 | 5 | 8 |
| | (16) | ES1 | ES1 | <5> | [1] + [4] | 270 | 290 | 8 | 10 |
| | (17) | SUJ2 | SUJ2 | <7> | [1] + [7] | 70 | 80 | 10 | 15 |
| | (18) | ES1 | ES1 | <1> | [1] + [5] | 260 | 285 | 8 | 10 |
| | (19) | SUJ2 | 5UJ2 | <6> | [1] + [6] | 80 | 90 | 8 | 10 |
| | (20) | ES1 | ES1 | <1> | [1] + [5] + [6] | 200 | 230 | 10 | 10 |
| | (21) | SUJ2 | SUJ2 | <1> | [1] + [9] | 60 | 80 | 10 | 12 |
| | (22) | ES1 | SUJ2 | <1> | [1] + [8] | 100 | 110 | 10 | 10 |
| Comparative | (1) | SUJ2 | SUJ2 | <10> | [1] | 1 | 1 | 100 | 100 |
| sample | (2) | SUS440C | SUS440C | <9> | [1] | 2 | 3 | 60 | 48 |

As apparent from Table 4, the samples (1) to (22) according this Example of the present invention exhibit very long torque life at each of −20° C. and 50° C., compared with comparative samples (1) and (2). Also, the samples (1) to (22) according this Example of the present invention is very small in the amount of loss by evaporation of the lubricant at each of −20° C. and 50° C., compared with comparative samples (1) and (2). The experimental data clearly support that a rolling device that is suitable for use under low temperature condition and unlikely to contaminate the outer environment and exhibits an excellent torque life can be obtained by using a base oil consisting of a liquid fluorinated polymer having a kinetic viscosity at −20° C. falling within a range of between 100 mm$^2$/sec and 3,000 mm$^2$/sec and having a vapor pressure of 2×10$^{-4}$ Torr or less at 50° C.

Samples (10) to (22) tend to be superior in the torque life to samples (1) to (9). This supports that the particular effect is rendered more prominent by adding a thickening agent other than the solid fluorinated polymer or by using $Si_3N_4$ for forming the rolling body.

Figure 2:
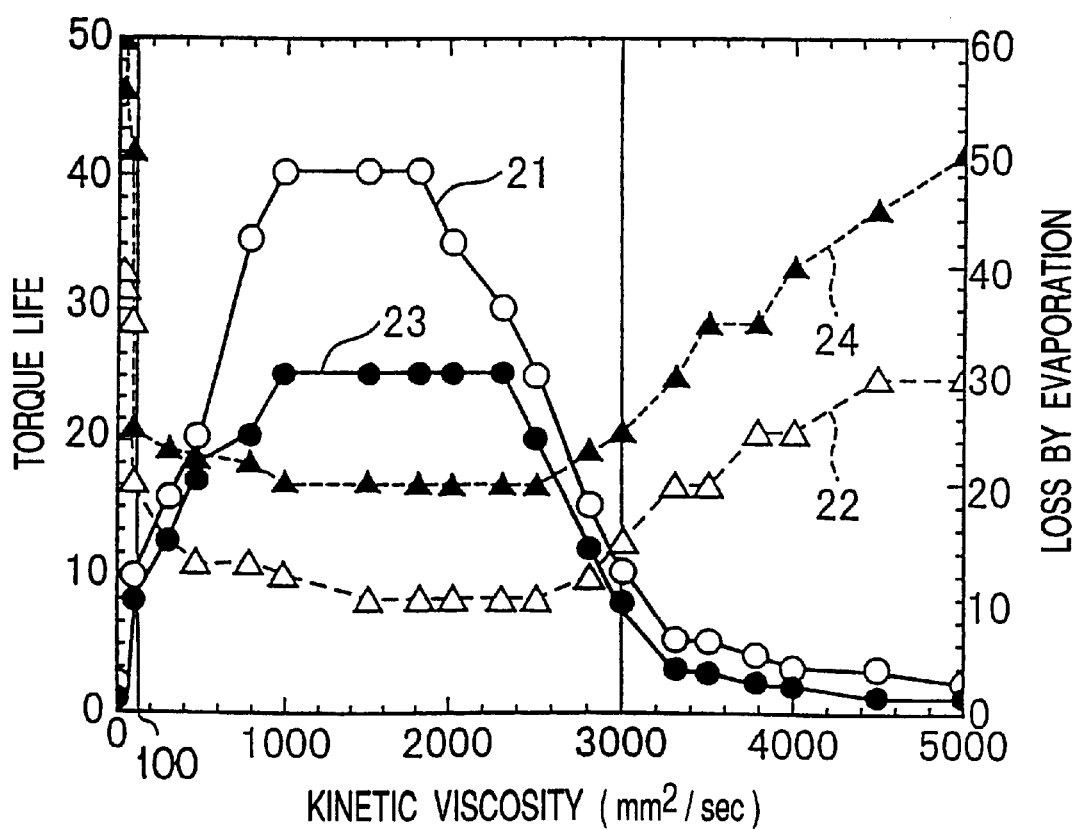
FIG. 2 is a graph showing the torque life of the ball-and-roller bearing and the amount of loss by evaporation of the lubricant at −20° C. according to Example 1 of the present invention.

Then, the relationships between the kinetic viscosity of the liquid fluorinated polymer oil used as a base oil and the torque life at −20° C. and between the kinetic viscosity of the liquid fluorinated polymer oil used as a base oil and the amount of loss by evaporation of the liquid fluorinated polymer oil at −20° C. were examined. Specifically, a plurality of lubricants 6 were prepared by mixing 80% by weight of liquid fluorinated polymer oils having the same vapor pressure at 50° C. and differing from each other in the kinetic viscosity at −20° C. and 20% by weight of the solid fluorinated polymer [1] shown in Table 2, and ball-and-roller bearings 1 were prepared by using these plural lubricants. Then, the torque life and the amount of loss by evaporation at −20° C. were measured by the methods described above for each of these ball-and-roller bearings 1. FIG. 2 shows the results.

Specifically, FIG. 2 is a graph showing the torque life and the amount of loss by evaporation of the lubricant at −20° C. for the ball-and-roller bearing in Example 1 of the present invention. In FIG. 2, the kinetic viscosity at −20° C. of the liquid fluorinated polymer oil used as the base oil is plotted on the abscissa. On the other hand, the torque life and the amount of loss by evaporation obtained by the driving at −20° C. are plotted on the ordinate of the graph. Curves 21 and 22 shown in the graph represent the torque life (curve 21) and the amount of loss by evaporation (curve 22) obtained in the case where the kinetic viscosity at −20° C. is changed with the vapor pressure at 50° C. of the liquid fluorinated polymer oil set constant at 2×10$^{-6}$ Torr. Likewise, curves 23 and 24 shown in the graph represent the torque life (curve 23) and the amount of loss by evaporation (curve 24) obtained in the case where the kinetic viscosity at −20° C. is changed with the vapor pressure at 50° C. of the liquid fluorinated polymer oil set constant at 5×10$^{-4}$ Torr.

As apparent from FIG. 2, where the vapor pressure of the liquid fluorinated polymer oil at 50° C. is 2×10$^{-6}$ Torr, it is possible to suppress the amount of loss by evaporation of the lubricant and to obtain a satisfactory torque life by setting the kinetic viscosity at −20° C. to fall within a range of between 100 mm$^2$/sec and 3,000 mm$^2$/sec.

Figure 3:
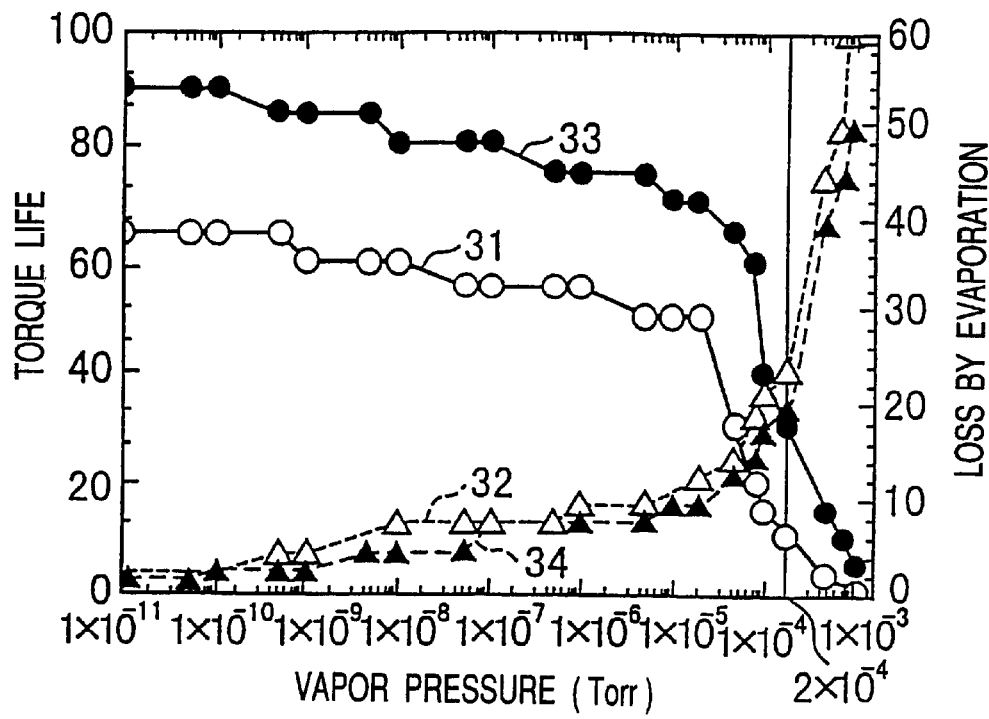
FIG. 3 is a graph showing the torque life of the ball-and-roller bearing and the amount of loss of the lubricant by evaporation at 50° C. according to Example 1 of the present invention.

Then, the relations between the kinetic viscosity of the liquid fluorinated polymer oil used as the base oil and the torque life at 50° C. and between the kinetic viscosity of the liquid fluorinated polymer oil used as the base oil and the amount of loss by evaporation at 50° C. were examined. Specifically, a plurality of lubricants 6 were prepared by mixing 80% by weight of liquid fluorinated polymer oils having the same vapor pressure at 50° C. and differing from each other in the kinetic viscosity at −20° C. and 20% by weight of the solid fluorinated polymer [1] shown in Table 2, and ball-and-roller bearings 1 were prepared by using these plural lubricants. Then, the torque life and the amount of loss by evaporation at 50° C. were measured by the methods described above for each of these ball-and-roller bearings 1. FIG. 3 shows the results.

Specifically, FIG. 3 is a graph showing the torque life at 50° C. and the amount of loss by evaporation of the lubricant for the ball-and-roller bearing in Example 1 of the present invention. In FIG. 3, the kinetic viscosity of the liquid fluorinated polymer oil used as the base oil is plotted on the abscissa. On the other hand, the torque life and the amount of loss by evaporation are plotted on the ordinate of the graph. Curves 31 and 32 shown in the graph represent the torque life (curve 31) and the amount of loss by evaporation (curve 32) obtained in the case where the kinetic viscosity at −20° C. of the liquid fluorinated polymer oil is set constant at 1800 mm$^2$/sec, while changing the vapor pressure at 50° C. Likewise, curves 33 and 34 shown in the graph represent the torque life (curve 33) and the amount of loss by evaporation (curve 34) obtained in the case where the kinetic viscosity at −20° C. of the liquid fluorinated polymer oil is set constant at 1000 mm$^2$/sec, while changing the vapor pressure at 50° C.

As apparent from FIG. 3, where the kinetic viscosity of the liquid fluorinated polymer oil at −20° C. is 1000 mm$^2$/sec, it is possible to suppress the amount of loss by evaporation of the lubricant and to obtain a satisfactory torque life by setting the vapor pressure at 2×10$^{-4}$ Torr or less at 50° C.

Figure 4:
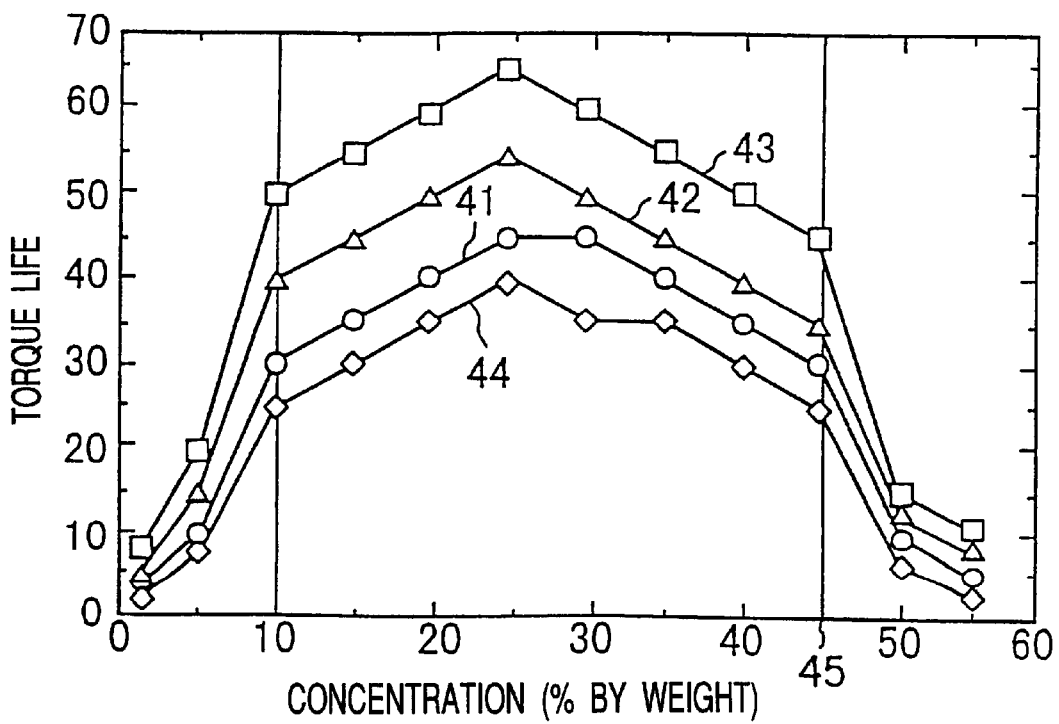
FIG. 4 is a graph showing the torque life at −20° C. of the ball-and-roller bearing according to Example 1 of the present invention.

Then, the relationship between the concentration of the solid fluorinated polymer contained in the lubricant and the torque life at −20° C. was examined by the method described below. Specifically, a plurality of lubricants 6 differing from each other in the concentration of the solid fluorinated polymer were prepared by mixing a liquid fluorinated polymer oil and the solid fluorinated polymer [1] shown in Table 1, and ball-and-roller bearings 1 were prepared by using these lubricants. Then, the torque life at −20° C. was measured by the method described previously for the ball-and-roller bearings 1 thus prepared. FIG. 4 shows the results.

Specifically, FIG. 4 is a graph showing the torque life at −20° C. of the ball-and-roller bearings in Example 1 of the present invention. In the graph of FIG. 4, the concentration of the solid fluorinated polymer [1] contained in the lubricant is plotted on the abscissa, with the torque life being plotted on the ordinate. Curves 41 to 44 shown in the graph represent the torque life obtained in each of the cases where the liquid fluorinated polymer oils <1>, <5>, <6> and <7> shown in Table 1 were used together with the solid fluorinated polymer [1].

As apparent from FIG. 4, a satisfactory torque life can be obtained by using the components described above for forming the lubricant and by setting the concentration of the thickening agent within the lubricant to fall within a range of between 10% by weight and 45% by weight.

Figure 5:
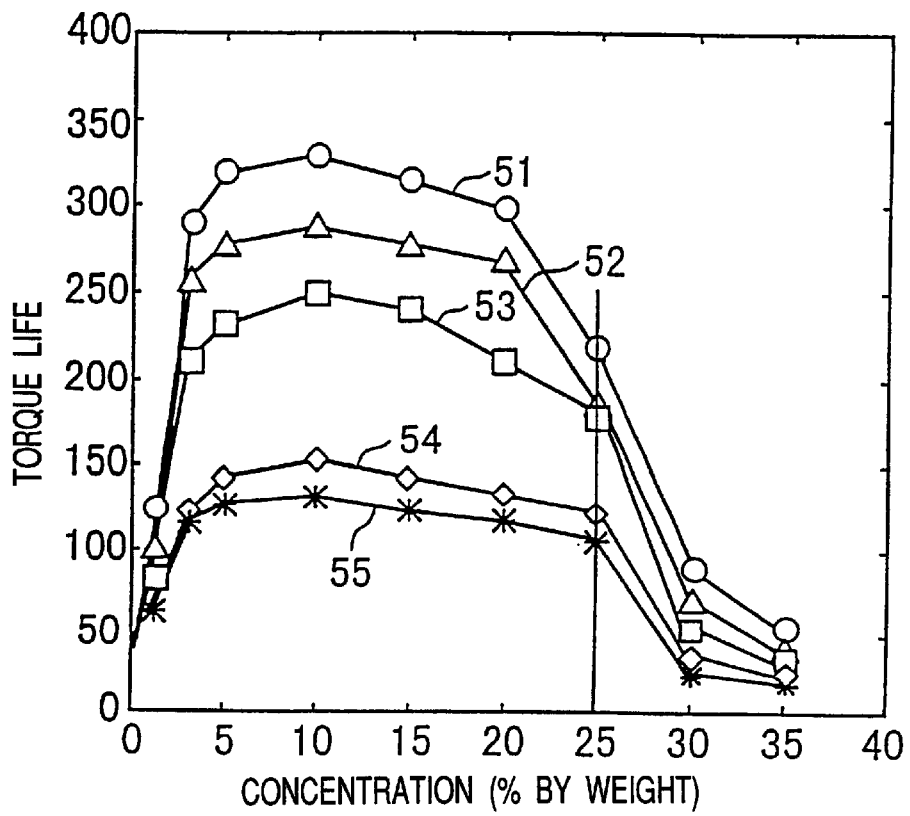
FIG. 5 is a graph showing the torque life at −20° C. of the ball-and-roller bearing according to Example 1 of the present invention.

Further, the relationship between the concentration of the thickening agent other than the solid fluorinated polymer in the lubricant and the torque life at −20° C. was examined by the method described below. Specifically, a plurality of lubricants 6 differing from each other in the concentration of the thickening agent other than the solid fluorinated polymer were prepared by mixing the liquid fluorinated polymer oil <1> shown in Table 1, 20% by weight of the solid fluorinated polymer [1], and a thickening agent other than the solid fluorinated polymer. The torque life at −20° C. was measured by the method described previously for each of the ball-and-roller bearings 1 prepared by using the lubricants thus prepared. FIG. 5 shows the results.

Specifically, FIG. 5 is a graph showing the torque life at −20° C. of the ball-and-roller bearing in Example 1 of the present invention. In the graph of FIG. 1, the concentration of the thickening agent other than the solid fluorinated polymer [1] in the lubricant is plotted on the abscissa, with the torque life being plotted on the ordinate. Curves 51 to 55 represent the torque life, covering cases where the thickening agents [3], [5], [2], [6] and [7] were used, respectively, for preparing the lubricants and the concentrations of these thickening agents were changed.

As apparent from FIG. 5, a satisfactory torque life can be obtained in the case where the lubricant is formed of the components described above and the concentration of the thickening agent contained in the lubricant except the solid fluorinated polymer falls within a range of between 0% by weight and 25% by weight. As described above, the data shown in FIG. 5 cover the case where the ball-and-roller bearing was formed by using the lubricant prepared by mixing a liquid fluorinated polymer oil, 20% by weight of the solid fluorinated polymer [1] and the thickening agent other than the solid fluorinated polymer. It follows that a satisfactory torque life can be obtained in the case where the sum of all the thickening agents is not larger than 45% by weight based on the lubricant.

In the measurement performed in conjunction with FIGS. 2 to 5, the inner ring 2, the outer ring 3 and the ball 4 were formed of ES-1 shown in Table 3, and a wave-shaped holder made of SUS304 was used as the holder 5. Also, a non-contact type shield plate made of SUS304 was used as the shield plate 7, and the lubricant 6 was sealed in each of the ball-and-roller bearings 1 in an amount of 80 mg. Further, in each of the graphs of FIGS. 2 to 5, the torque life is indicated by a relative value obtained in the case where the rotating time obtained in conjunction with comparative sample (1) is set at 1, and the amount of loss by evaporation is indicated by a relative value obtained in the case where the amount of reduction of the weight of the lubricant 6 obtained in respect of comparative example (1) is set at 100.

As apparent from the experimental data, each of samples (1) to (22) in Example 1 of the present invention is small in the amount of loss by evaporation of the lubricant and exhibits an excellent torque life even when driven under low temperature conditions. To be more specific, the lubricant used in each of samples (1) to (22) is low in its resistance to stirring and, thus, is capable of suppressing the loss of power of the motor, etc. even under the low temperature conditions. Also, the heat generation accompanying the increase in the torque is suppressed. In addition, since the lubricant has a sufficiently low vapor pressure, it is possible to suppress the evaporation of the lubricant from the ball-and-roller bearing. It follows that it is possible to prevent the contamination of the outer environment, e.g., contamination of the coolant, of the ball-and-roller bearing.

EXAMPLE 2

This Example is directed to a ball-and-roller bearing constructed as shown in FIG. 1 and adapted for use under high temperatures, a high operating speed and under vacuum conditions.

First of all, the life of the ball-and-roller bearing 1 constructed as shown in FIG. 1 was examined by changing the composition of the lubricant 6 in various fashions. Specifically, a ball bearing (Type No. 608) manufactured by Nippon Seiko K.K., which had an inner diameter of 8 mm, an outer diameter of 22 mm and a width of 7 mm was used as the ball-and-roller bearing 1, and the life of the ball-and-roller bearing 1 was measured by using a bearing rotation test machine manufactured by Nippon Seiko K.K.

The life of the ball-and-roller bearing 1 was measured by a method differing from the method employed in Example 1. Specifically, the rotating time until the vibration value was increased to reach a value 3 times as large as that in the initial state was considered to be the life of the ball-and-roller bearing 1, which was measured under the conditions given below:

Temperature: 40° C., 100° C.
Atmosphere: Air atmosphere, Vacuum ($1\times10^{-4}$ Torr)
Rotating speed: 8,000 rpm
Axial load: 196N
Radial load: 1.96N Table 5 shows the materials used as the base oil of the lubricant 6 in this Example. In this Example, the materials shown in Table 2 were used as the thickening agents and as the oily compounds of the lubricant 6. Further, the materials shown in Table 3 were used for forming the inner ring 2, the outer ring 3 and the rolling body 4.

Table 6 shows the materials used for forming the inner ring 2, the outer ring 3, the rolling body 4 and the lubricant 6 as well as the loading amounts of the lubricant 6 in the ball-and-roller bearing 1 and the life obtained by the method described above.

In samples (28) to (63) and comparative samples (4) to (6), the concentration of any of the solid fluorinated polymer [1], the layered mineral powder [2] and the organic ultra fine particles [5] in the lubricant 6 was set at 20% by weight, and the concentration of the oily compound [10] in any of samples (27) and (56) to (63) was set at 3% by weight. Also, the concentration of the amino acid compound [6] was set at 2% by weight and the concentration of the organic ultra fine particles [5] was set at 1% by weight in each of samples (52) and (63). Further, the concentration of any of the layered mineral powder [2], the diamond fine particles [3], fullerene [4], the organic ultra fine particles [5], the amino acid compound [6], MCA [7], the fluorinated pitch [8] and nBN [9] was set at 3% by weight in samples (43) to (51), (53), (54), and (56) to (62). In Table 6, the life is indicated as a relative value obtained in the case where the rotating time obtained in respect of comparative sample (3) is set at 1.

TABLE 5

| Base oil (liquid fluorinated polymer oil) | | | Kinetic viscosity (mm²/sec) | |
|---|---|---|---|---|
| | | | 40° C. | 100° C. |
| PFPE oil | <11> | S-65 | 65 | 14 |
| | <12> | S-100 | 100 | 20 |
| | <13> | Y25 | 81 | 10.4 |
| | <14> | Z03 | 18 | 5.6 |
| | <15> | Z15 | 92 | 28 |
| | <16> | Z25 | 159 | 49 |
| | <17> | IEL/V | 65 | 13 |
| | <18> | 143AC | 270 | 26 |
| | <19> | GPL104 | 60 | 9 |
| | <20> | 815Z | 148 | 45 |
| | <21> | YR | 345 | 33 |
| | <22> | Z60 | 355 | 98 |
| | <23> | J400 | 450 | 30 |
| | <24> | HP-870 | 500 | 100 |

TABLE 6

| | | Material | | | Lubricant | Loading amount (mg) | Life | | | |
|---|---|---|---|---|---|---|---|---|---|---|
| | | | | | | | Air atmosphere | | Vacuum | |
| | | Inner ring · outer ring | Rolling body | Base oil | Additive | | 40° C. | 100° C. | 40° C. | 100° C. |
| Sample | (23) | SUJ2 | SUJ2 | <11> | — | 30 | 20 | 15 | 25 | 20 |
| | (24) | SUJ2 | ES1 | <15> | — | 30 | 35 | 30 | 40 | 35 |
| | (25) | ES1 | ES1 | <16> | — | 30 | 30 | 25 | 38 | 35 |
| | (26) | ES1 | Si₃N₄ | <17> | — | 30 | 100 | 90 | 150 | 140 |
| | (27) | SUS440C | SUS440C | <11> | [10] | 30 | 25 | 20 | 120 | 110 |
| | (28) | SUJ2 | SUJ2 | <11> | [1] | 100 | 50 | 45 | 60 | 55 |
| | (29) | ES1 | ES1 | <11> | [1] | 100 | 90 | 85 | 100 | 95 |
| | (30) | SUJ2 | ES1 | <12> | [1] | 100 | 60 | 55 | 70 | 65 |
| | (31) | SUJ2 | SUS440C | <13> | [1] | 100 | 65 | 60 | 75 | 70 |
| | (32) | SUS440C | SUS440C | <14> | [1] | 100 | 55 | 50 | 60 | 58 |
| | (33) | ES1 | ES1 | <15> | [1] | 100 | 50 | 140 | 180 | 170 |
| | (34) | ES1 | ES1 | <16> | [1] | 100 | 130 | 120 | 160 | 150 |
| | (35) | ES1 | ES1 | <17> | [1] | 100 | 90 | 85 | 100 | 93 |
| | (36) | ES1 | SUJ2 | <18> | [1] | 100 | 50 | 43 | 50 | 45 |
| | (37) | SUJ2 | Si₃N₄ | <19> | [1] | 100 | 200 | 150 | 250 | 240 |
| | (38) | ES1 | ZrO₂ | <20> | [1] | 100 | 180 | 200 | 230 | 250 |
| | (39) | ES1 | Sialon | <21> | [1] | 100 | 130 | 150 | 170 | 180 |
| | (40) | ES1 | Si₃N₄ | <11> | [1] | 100 | 300 | 290 | 350 | 330 |
| | (41) | ES1 | ES1 | <11> | [2] | 100 | 80 | 75 | 70 | 65 |
| | (42) | ES1 | ES1 | <16> | [5] | 100 | 100 | 95 | 130 | 120 |
| | (43) | SUJ2 | SUJ2 | <11> | [1] + [2] | 100 | 150 | 140 | 120 | 110 |
| | (44) | ES1 | ES1 | <11> | [1] + [2] | 100 | 260 | 250 | 200 | 180 |
| | (45) | SUJ2 | Si₃N₄ | <16> | [1] + [2] | 100 | 500 | 470 | 350 | 310 |
| | (46) | ES1 | Si₃N₄ | <17> | [1] + [2] | 100 | 450 | 430 | 300 | 280 |
| | (47) | SUS440C | SUS440C | <11> | [1] + [3] | 100 | 450 | 445 | 550 | 540 |
| | (48) | ES1 | ES1 | <15> | [1] + [4] | 100 | 400 | 390 | 500 | 470 |
| | (49) | SUJ2 | SUJ2 | <17> | [1] + [7] | 100 | 100 | 90 | 80 | 70 |
| | (50) | ES1 | ES1 | <11> | [1] + [5] | 100 | 370 | 330 | 200 | 150 |
| | (51) | SUJ2 | Si₃N₄ | <16> | [1] + [6] | 100 | 400 | 390 | 500 | 480 |
| | (52) | ES1 | Si₃N₄ | <11> | [1] + [5] + [6] | 100 | 500 | 480 | 400 | 370 |
| | (53) | SUJ2 | SUJ2 | <11> | [1] + [9] | 100 | 100 | 95 | 130 | 125 |
| | (54) | ES1 | SUJ2 | <11> | [1] + [8] | 100 | 280 | 270 | 250 | 230 |
| | (55) | ES1 | ES1 | <11> | [1] + [8] + [10] | 100 | 90 | 80 | 300 | 290 |
| | (56) | ES1 | ES1 | <11> | [1] + [2] + [10] | 100 | 250 | 245 | 350 | 340 |
| | (57) | ES1 | ZrO₂ | <11> | [1] + [3] + [10] | 100 | 700 | 690 | 650 | 640 |
| | (58) | ES1 | Si₃N₄ | <11> | [1] + [4] + [10] | 100 | 600 | 580 | 550 | 540 |

TABLE 6-continued

|  |  | Material | | Lubricant | | Loading amount (mg) | Life | | | |
|---|---|---|---|---|---|---|---|---|---|---|
|  |  |  |  |  |  |  | Air atmosphere | | Vacuum | |
|  |  | Inner ring · outer ring | Rolling body | Base oil | Additive |  | 40° C. | 100° C. | 40° C. | 100° C. |
|  | (59) | ES1 | Sialon | <11> | [1] + [7] + [10] | 100 | 300 | 290 | 400 | 390 |
|  | (60) | SUS440C | SUS440C | <11> | [1] + [5] + [10] | 100 | 200 | 190 | 300 | 290 |
|  | (61) | ES1 | ES1 | <11> | [1] + [6] + [10] | 100 | 180 | 170 | 250 | 240 |
|  | (62) | ES1 | ES1 | <11> | [1] + [9] + [10] | 100 | 150 | 140 | 200 | 180 |
|  | (63) | ES1 | ES1 | <11> | [1] + [5] + [6] + [10] | 100 | 300 | 290 | 400 | 390 |
| omparative ample | (3) | SUS440C | SUS440C | <24> | — | 30 | 1 | 1 | 1 | 1 |
|  | (4) | SUS440C | SUS440C | <24> | [1] | 100 | 3 | 3 | 5 | 5 |
|  | (5) | SUS440C | SUS440C | <22> | [1] | 100 | 6 | 4 | 8 | 7 |
|  | (6) | SUS440C | SUS440C | <23> | [1] | 100 | 4 | 5 | 6 | 6 |

As apparent from Table 6, each of samples (23) to (63) for the Example of the present invention has a very long life time at each of 40° C. and 100° C., compared with comparative samples (3) to (6), both under the air atmosphere and under the vacuum. The experimental data clearly support that a rolling device adapted for use under high temperature, high driving speed or vacuum condition and exhibiting an excellent torque life can be obtained by using a liquid fluorinated polymer oil having a kinetic viscosity of 10 mm$^2$/sec to 400 mm$^2$/sec at 40° C. and a kinetic viscosity of 3 mm$^2$/sec to 80 mm$^2$/sec at 100° C.

Figure 6:
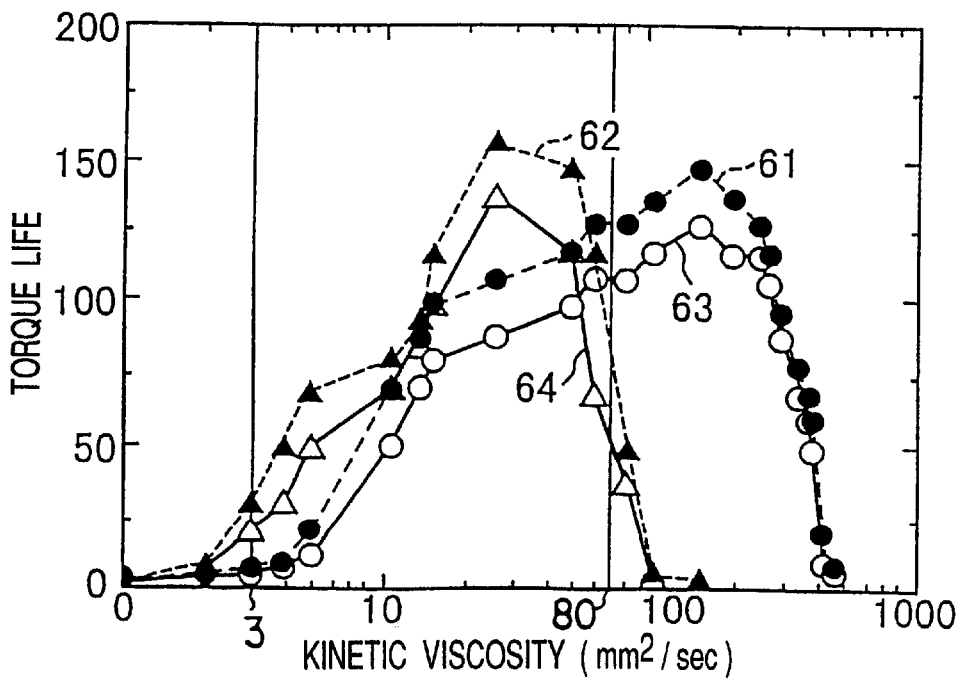
FIG. 6 is a graph showing the torque life at 40° C. and 100° C. of the ball-and-roller bearing according to Example 2 of the present invention.

Then, the relationship between the kinetic viscosity of the liquid fluorinated polymer oil used as a base oil and the torque life by the method described below. Specifically, a plurality of lubricants were prepared by mixing a plurality of liquid fluorinated polymer oils differing from each other in the kinetic viscosity at 40° C. with the solid fluorinated polymer [1] shown in Table 2 such that the concentration of the solid fluorinated polymer [1] in the resultant lubricant is 20% by weight. Then, ball-and-roller bearings 1 were prepared by using these lubricants, followed by measuring the torque life under vacuum and under the air atmosphere at 40° C. and 100° C. by the method similar to that described previously in conjunction with Example 1. FIG. 6 shows the results.

FIG. 6 is a graph showing the torque life of each of the ball-and-roller bearings in Example 2 of the present invention at 40° C. and 100° C. In the graph of FIG. 6, the kinetic viscosity at 40° C. of the liquid fluorinated polymer oil used as a base oil is plotted on the abscissa, with the torque life obtained by the driving at 40° C. and 100° C. being plotted on the ordinate. Curve 61 shown in FIG. 6 denotes the torque life obtained at 40° C. and under vacuum. Curve 62 shown in FIG. 6 denotes the torque life obtained at 100° C. and under vacuum. Curve 63 shown in FIG. 6 denotes the torque life obtained at 40° C. and under the air atmosphere. Further, Curve 64 shown in FIG. 6 denotes the torque life obtained at 100° C. and under the air atmosphere.

As apparent from FIG. 6, a satisfactory torque life can be obtained even under the high temperature conditions, where the kinetic viscosity of the liquid fluorinated polymer oil falls within a range of between 3 mm$^2$/sec and 80 mm$^2$/sec at 40° C.

Figure 7:
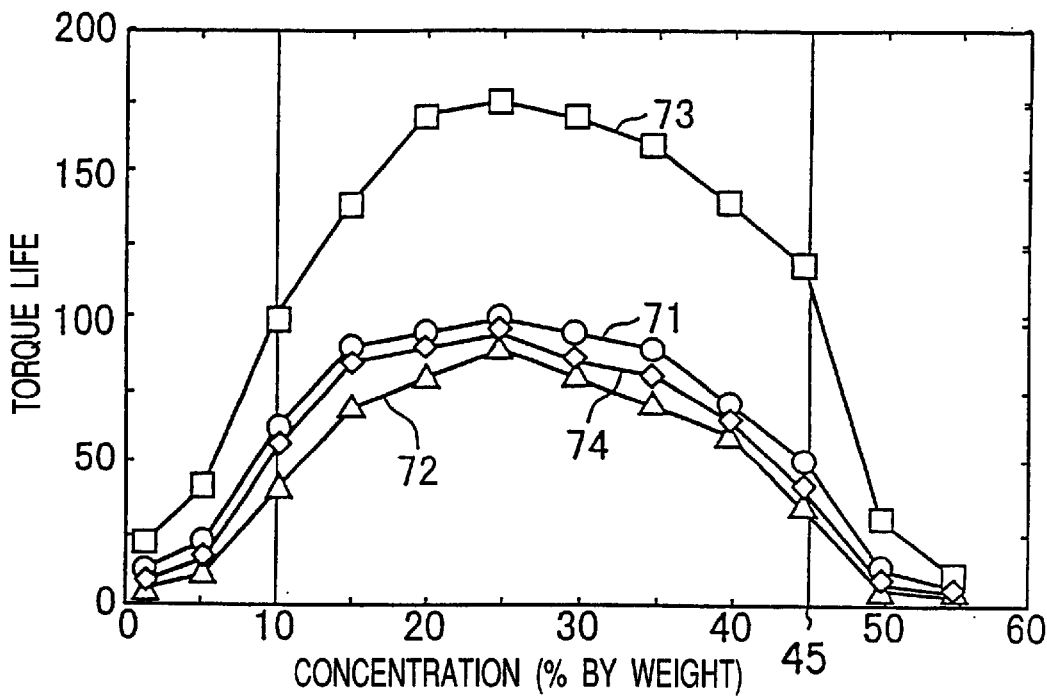
FIG. 7 is a graph showing the torque life at 100° C. and under vacuum of the ball-and-roller bearing according to Example 2 of the present invention.

Then, the relationship between the concentration of the solid fluorinated polymer in the lubricant and the torque life was examined by the method described below. Specifically, a plurality of lubricants 6 differing from each other in the concentration of the solid fluorinated polymer [1] were prepared by mixing the liquid fluorinated polymer oil <11> shown in Table 5 with the solid fluorinated polymer [1] shown in Table 2, ball-and-roller bearings 1 were prepared by using these lubricants. Also, a plurality of ball-and-roller bearings 1 differing from each other in the concentration of the solid fluorinated polymer [1] were prepared similarly, except that the liquid fluorinated polymer oils <13>, <15> and <17> were used in place of the liquid fluorinated polymer oil <11> used in the experiment described above. Then, the torque life of each of these ball-and-roller bearings 1 was measured at 100° C. and under vacuum by the method described above. FIG. 7 shows the results.

Specifically, FIG. 7 is a graph showing the torque life under vacuum of each of the ball-and-roller bearings for Example 2 of the present invention. In the graph of FIG. 7, the concentration of the solid fluorinated polymer in the lubricant is plotted on the abscissa, with the torque life being plotted on the ordinate. Curves 71 to 74 shown in the graph represents the torque life obtained in the case of using the liquid fluorinated polymer oils <11>, <13>, <15> and <17> while changing the concentration of the solid fluorinated polymer [1].

As apparent from FIG. 7, a satisfactory torque life can be obtained in the case of setting the concentration of the solid fluorinated polymer [1] in the lubricant, i.e., the concentration of the thickening agent, to fall within a range of between 10% by weight and 45% by weight.

Figure 8:
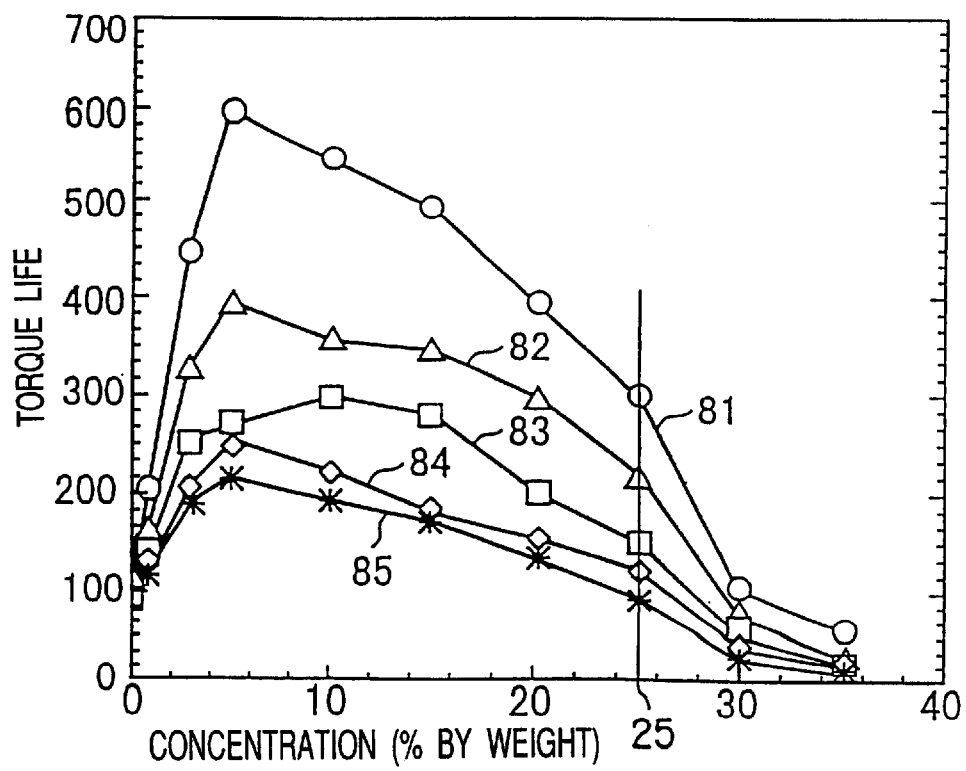
FIG. 8 is a graph showing the torque life at 100° C. and under vacuum of the ball-and-roller bearing according to Example 2 of the present invention.

Then, the relationship between the concentration of the thickening agent other than the solid fluorinated polymer in the lubricant and the torque life was examined by the method described below. Specifically, a plurality of lubricants 6 differing from each other in the concentration of the thickening agent other than the solid fluorinated polymer [1] were prepared by mixing the liquid fluorinated polymer oil <11> shown in Table 5, 20% by weight of the solid fluorinated polymer [1], and the thickening agent other than the solid fluorinated polymer [1]. Ball-and-roller bearings 1 were prepared by using these lubricants, and the torque life of each of these ball-and-roller bearings 1 was measured by the method described above. FIG. 8 shows the results.

Specifically, FIG. 8 is a graph showing the torque life of the ball-and-roller bearing in Example 2 of the present invention at 100° C. and under vacuum. The concentration of the thickening agent other than the solid fluorinated polymer [1] in the lubricant is plotted on the abscissa of the graph, with the torque life being plotted on the ordinate. Curves 81 to 85 shown in FIG. 8 represent the torque life obtained in the case of using the thickening agents [3], [5], [2], [6] and [7] while changing the concentration of these thickening agents.

As apparent from FIG. 8, a satisfactory torque life can be obtained in the case where the lubricant is formed of the components described above and where the concentration of the thickening agent other than the solid fluorinated polymer [1] in the lubricant falls within a range of between 0% by weight and 25% by weight. As described above, the data shown in FIG. 8 covers the ball-and-roller bearing using a lubricant prepared by mixing the liquid fluorinated polymer oil <11>, 20% by weight of the solid fluorinated polymer [1] and the thickening agent other than the solid fluorinated polymer [1]. It follows that a satisfactory torque life can be obtained in the case where the sum of all the thickening agents is not larger than 45% by weight of the lubricant.

Figure 9:
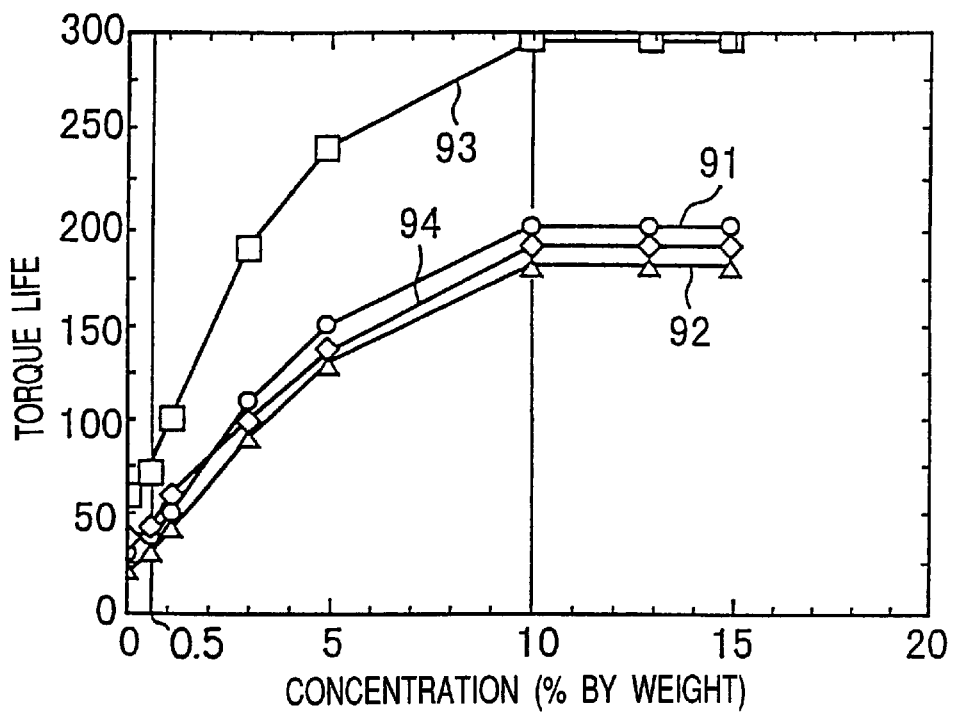
FIG. 9 is a graph showing the torque life at 100° C. and under vacuum of the ball-and-roller bearing according to Example 2 of the present invention.

Then, the relationship between the concentration of the oily compound [10] in the lubricant and the torque life was examined. Specifically, a plurality of lubricants 6 differing from each other in the concentration of the oily compound [10] were prepared by mixing the liquid fluorinated polymer oil <11> shown in Table 5 with the oily compound [10] shown in Table 2. Ball-and-roller bearings 1 were prepared by using these lubricants. Also, additional ball-and-roller bearings 1 differing from each other in the concentration of the oily compound [10] were prepared as above, except that the liquid fluorinated polymers <13>, <15>, and <17> were used in place of the liquid fluorinated polymer oil <11>. The torque life of each of these ball-and-roller bearings was measured at 100° C. and under vacuum by the method described above. FIG. 9 shows the result.

Specifically, FIG. 9 is a graph showing the torque life of the ball-and-roller bearing according to Example 2 of the present invention at 100° C. and under vacuum. The concentration of the oily compound [10] in the lubricant is plotted on the abscissa of the graph, with the torque life being plotted on the ordinate. Curves 91 to 94 shown in the graph represent the torque life obtained in the case of using the liquid fluorinated polymer oils <11>, <13>, <15> and <17> while changing the concentration of the oily compound [10].

As apparent from FIG. 9, a satisfactory torque life can be obtained by increasing the concentration of the oily compound [10] in the lubricant. However, where the oily compound [10] is contained in the lubricant, the manufacturing cost of the ball-and-roller bearing 1 is increased in general with increase in the concentration of the oily compound [10]. It follows that a satisfactory torque life can be obtained with a relatively low cost by setting the concentration of the oily compound [10] at a level not higher than 10% by weight at which the effect produced by the addition of the oily compound [10] is saturated. Also, the particular effect can be obtained by setting the concentration of the oily compound [10] at about 0.5% by weight.

Figure 10:
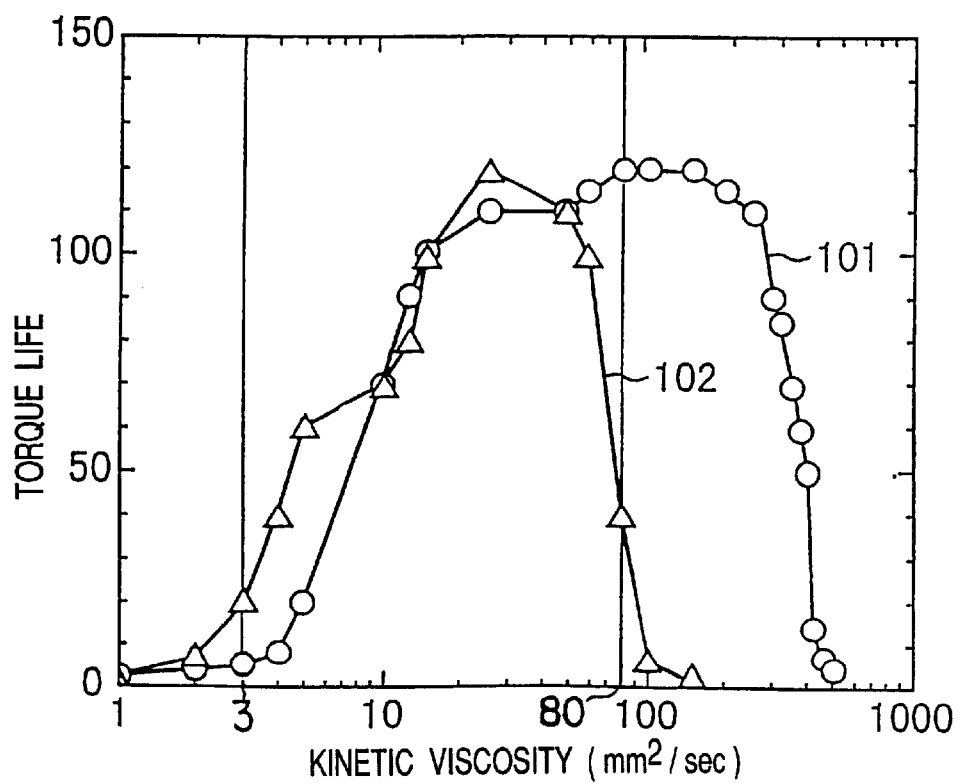
FIG. 10 is a graph showing the torque life at 40° C. and 100° C. of the ball-and-roller bearing according to Example 2 of the present invention.

Then, the relationship between the kinetic viscosity of the liquid fluorinated oil and the torque life was examined in respect of the lubricant containing 77% by weight of the liquid fluorinated polymer oil, 20% by weight of the solid fluorinated polymer [1], and 3% by weight of the oily compound [10]. FIG. 10 shows the results.

Specifically, FIG. 10 is a graph showing the torque life of the ball-and-roller bearing according to Example 2 of the present invention at 40° C. and 100° C. In the graph of FIG. 10, the kinetic viscosity of the liquid fluorinated polymer oil at 40° C. is plotted on the abscissa, with the torque life obtained by the driving under 40° C. and 100° C. being plotted on the ordinate. Curve 101 shown in FIG. 10 represents the torque life obtained at 40° C. and under vacuum. On the other hand, curve 102 shown in FIG. 10 represents the torque life obtained at 100° C. and under vacuum.

As apparent from FIG. 10, a satisfactory torque life can be obtained even under high temperature conditions in the case where the kinetic viscosity of the liquid fluorinated polymer oil at 40° C. falls within a range of between 3 mm$^2$/sec and 80 mm$^2$/sec.

Figure 11:
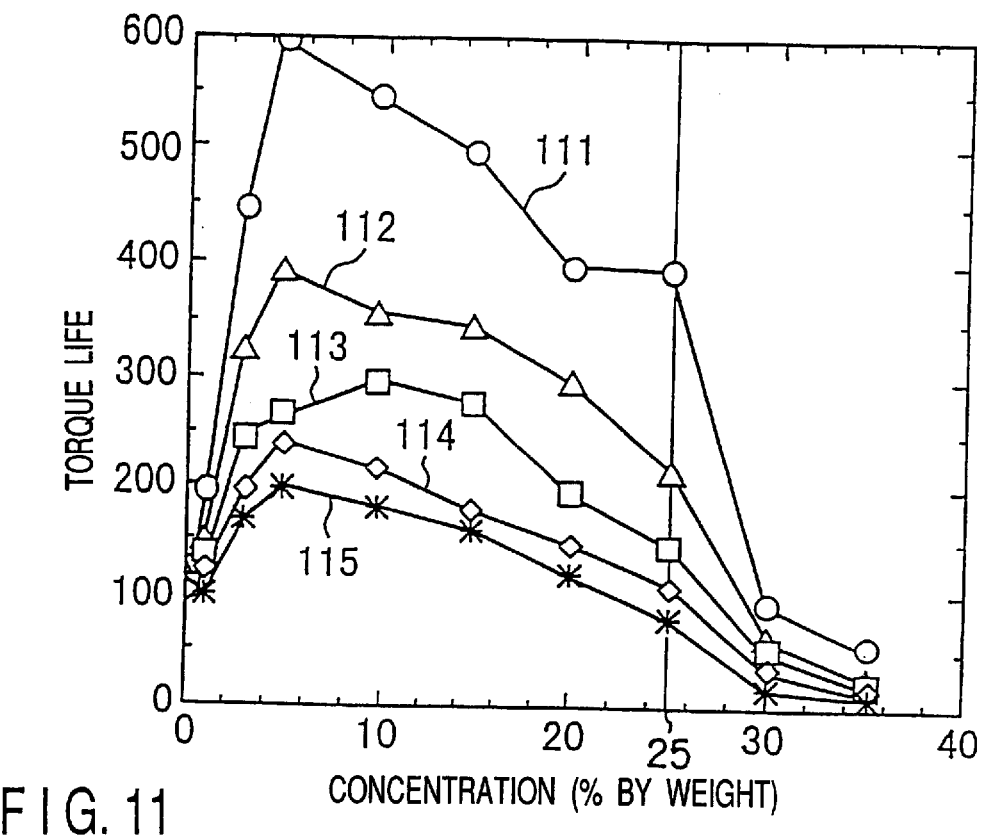
FIG. 11 is a graph showing the torque life at 100° C. and under atmospheric pressure of the ball-and-roller bearing according to Example 2 of the present invention.

Further, the relationship between the concentration of the thickening agent other than the solid fluorinated polymer [1] in the lubricant and the torque life was examined by the method described below with respect to the lubricant containing the liquid fluorinated polymer oil <1>, the solid fluorinated polymer [1] and the oily compound [10]. Specifically, a plurality of lubricants 6 differing from each other in the concentration of the thickening agent other than the solid fluorinated polymer were prepared by mixing the liquid fluorinated polymer <1>, 20% of the solid fluorinated polymer [1], a thickening agent other than the solid fluorinated polymer [1] and 3% by weight of the oily compound [10]. The torque life of each of the ball-and-roller bearings 1 prepared by using these lubricants 6 was measured by the method described above at 100° C. and under the air atmosphere. FIG. 11 shows the results.

Specifically, FIG. 11 is a graph showing the torque life of the ball-and-roller bearing in Example 2 of the present invention at 100° C. and under the atmospheric pressure. The concentration of the thickening agent other than the solid fluorinated polymer [1] in the lubricant is plotted on the abscissa of the graph, with the torque life being plotted on the ordinate. Curves 111 to 115 shown in FIG. 11 represent the torque life obtained in the case of using the thickening agents [3], [5], [2], [6] and [7] and changing the concentrations of these thickening agents.

As apparent from FIG. 11, a satisfactory torque life is obtained in the case where the concentration of the thickening agent other than the solid fluorinated polymer [1] in the lubricant falls within a range of between 0% by weight and 25% by weight. As described previously, the data given in FIG. 11 cover the ball-and-roller bearings using the lubricants prepared by mixing the liquid fluorinated polymer oil [11], 20% by weight of the solid fluorinated polymer [1], 3% by weight of the oily compound [10], and the thickening agent other than the solid fluorinated polymer [1]. It follows that a satisfactory torque life can be obtained in the case where the sum of the thickening agents is not larger than 45% by weight of the lubricant.

In the measurements performed in conjunction with FIGS. 6 to 11, the inner ring 2, the outer ring 3 and the ball 4 were made of ES-1 shown in Table 3, a wave-shaped holder made of SUS304 was used as the holder 5, and a non-contact type shield plate made of SUS304 was used as the shield plate 7. The lubricant 6 was sealed in each of the ball-and-roller bearings 1 in an amount of 10 mg in the tests relating to FIGS. 6 to 8, 10 and 11 and in an amount of 30 mg in the test relating to FIG. 9. In each of FIGS. 6 to 11, the torque life is indicated as a relative value obtained in the case where the rotating time obtained in conjunction with comparative sample (3) is set at 1.

As described above, a satisfactory torque life can be obtained in each of samples (23) to (63) in Example 2 of the present invention even under high speed, high temperature or vacuum condition. To be more specific, the heat generation accompanying the increased torque can be suppressed in the lubricant used in each of samples (23) to (63) even under high operating speed, high temperature or vacuum condition, making it possible to suppress the abnormal abrasion and seizing. In other words, these ball-and-roller bearings can be operated over a long period of time. Also, since the heat generation accompanying the increased torque is suppressed in samples (23) to (63), it is possible to suppress evaporation of the lubricant from the ball-androller bearing. It follows that the lubricant prevents the outer environment of the ball-and-roller bearing from being contaminated.

EXAMPLE 3

This Example is directed to a ball-and-roller bearing adapted for use under high temperature, high operating speed and heavy load condition.

In the first step, a ball-and-roller bearing 1 having a construction similar to that shown in FIG. 1 was prepared by changing in various fashions the composition of the lubricant (grease) 6. Incidentally, a deep groove ball bearing 1 having an adhesive rubber seal attached thereto, said ball bearing having an inner diameter of 17 mm, an outer diameter of 47 mm, and a width of 14 mm, was used as the ball-and-roller bearing 1. The grease was sealed in an amount of 30% of the bearing space volume.

Then, the seizing life of each of these ball-and-roller bearings was examined as follows. Specifically, the bearing 1 was continuously rotated with the rotating speed of the inner ring 2 set at 17,000 rpm, the temperature of the outer ring 3 set at 200° C., and the radial load set at 500 kg. The life time ranging between the rotation start-up of the bearing 1 and the seizing generation was measured on the assumption that seizing took place when the temperature of the outer ring 3 was increased to reach 220° C. Incidentally, the life time was measured 4 times for each sample so as to obtain the average value.

The life times obtained by the method described above were relatively compared, with the life time obtained for the bearing 1 using a base oil having a kinetic viscosity of 100 mm$^2$/sec at 40° C. set at 1. Table 7 shows the kinds of the thickening agent, the base oil and the additive used in lubricant 6 as well as the kinetic viscosity at 40° C. of the base oil used.

TABLE 7

| | Thickening agent | Base oil | Viscosity of base oil at 40° C. (mm$^2$/sec) | Additive |
| --- | --- | --- | --- | --- |
| Group 1 | PTFE | Base oil 1 | 6, 15, 30, 60, 160, 250, 440 | None |
| Group 2 | PTFE | Base oil 2 | 20, 60, 70, 90, 150, 300 | None |
| Group 3 | PTFE | Base oil 1 | 6, 30, 60, 160, 250, 440 | MCA |
| Group 4 | Urea compound | Base oil 3 | 50, 100, 250, 400 | None |

In Table 7, the lubricants are classified into groups 1 to 4 depending on the kinds of the thickening agent, the base oil and the additive used. Base oil 1 shown in Table 7 consists of the compound represented by general formula (10) given previously. Base oil 2 consists of the compound represented by general formula (12) given below. Further, base oil 3 consists of the compound represented by general formula (13) given below. In each of general formulas (12) and (13), each of m and n represents a positive integer. Also, m and n in general formula (12) satisfies the relationship m/n<1. Further, the substituent R in general formula (13) represents an alkyl group:

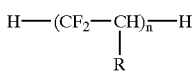

$$H—(CF_2—CH)_n—H \atop R \qquad (13)$$

Figure 12:
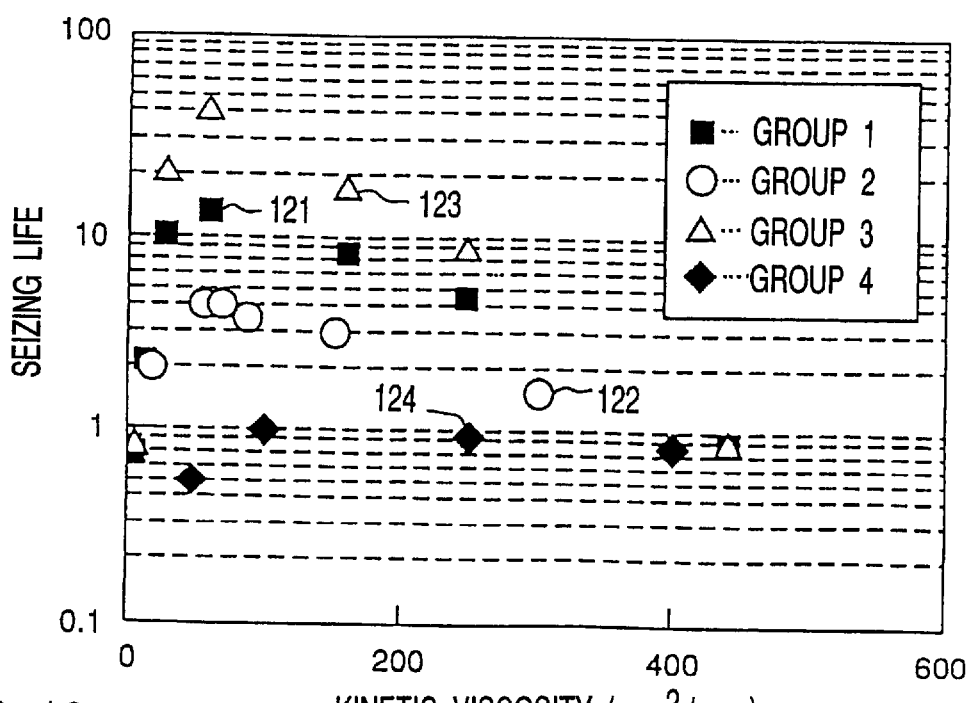
FIG. 12 is a graph showing the seizing life of the ball-and-roller bearing according to Example 3 of the present invention.

FIG. 12 is a graph showing the relationship between the seizing life of the bearing 1 using the lubricant of the composition shown in Table 7 and the kinetic viscosity of the base oil at 40° C. In FIG. 12, the kinetic viscosity of the base oil at 40° C. is plotted on the abscissa, with a relative value of the seizing life being plotted on the ordinate. Also, reference numerals 121 to 124 in FIG. 14 represent data corresponding to groups 1 to 4 shown in Table 7.

As apparent from FIG. 12, the seizing life for each of groups 1 to 3 is longer than the seizing life for group 4. In other words, where PTFE is used as the thickening agent, better seizing life characteristics can be obtained, compared with the case of using an urea compound as a thickening agent. It is also seen that particularly satisfactory seizing life characteristics can be achieved where the kinetic viscosity of the base oil at 40° C. falls within a range of between 10 mm$^2$/sec and 400 mm$^2$/sec in groups 1 to 3.

The description given above covers mainly the case where PFPE oil is used as the base oil. However, similar effects can also be obtained in the case where another liquid fluorinated polymer oil is used as the base oil. Also, the Example described above covers the case where the rolling device of the present invention is used as a ball-and-roller bearing. However, similar effects can also be obtained in the case where the rolling device of the present invention is used as a rectilinear device such as a ball screw device or a linear guide.

As described above, in the rolling device of the present invention, the base oil of the lubricant is selected from the group consisting of a liquid fluorinated polymer oil having a kinetic viscosity at −20° C. falling within a range of between 100 mm$^2$/sec and 3,000 mm$^2$/sec and having a vapor pressure at 50° C. not higher than 2×10$^{-4}$ Torr, a liquid fluorinated polymer oil having a kinetic viscosity at 40° C. falling within a range of between 10 mm$^2$/sec and 400 mm$^2$/sec and having a kinetic viscosity at 100° C. falling within a range of between 3 mm$^2$/sec and 80 mm$^2$/sec, and a liquid fluorinated polymer oil having a kinetic viscosity at 40° C. falling within a range of between 10 mm$^2$/sec and 400 mm$^2$/sec.

In the case of using as a base oil a liquid fluorinated polymer oil having a kinetic viscosity at −20° C. falling within a range of between 100 mm$^2$/sec and 3,000 mm$^2$/sec and having a vapor pressure at 50° C. not higher than 2×10$^{-4}$ Torr, the rolling device can be driven with a low torque even under the low temperature conditions while substantially preventing the loss by evaporation or the like of the lubricant. Therefore, the contamination of the outer environment can be prevented and an excellent torque life can be achieved under the low temperature conditions by using the particular liquid fluorinated polymer oil as the base oil of the lubricant.

Also, in the case of using as a base oil a liquid fluorinated polymer oil having a kinetic viscosity at 40° C. falling within a range of between 10 mm$^2$/sec and 400 mm$^2$/sec and having a kinetic viscosity at 100° C. falling within a range of between 3 mm$^2$/sec and 80 mm$^2$/sec, it is possible to prevent the leakage and evaporation of the lubricant and elevation of the torque even under high temperature, high operating speed or vacuum condition. In other words, it is possible to suppress the contamination of the outer environment and to obtain a sufficient torque life even under high temperature, high operating speed or vacuum condition.

Further, in the case of using as a lubricant a grease composition containing a mixture of a base oil and a thickening agent, and the base oil consists of a liquid fluorinated polymer oil having a kinetic viscosity at 40° C. falling within a range of between 10 mm$^2$/sec and 400 mm$^2$/sec, it is possible to achieve a sufficient resistance to seizing even under high temperature, high operating speed and heavy load condition.

As described above, the present invention provides a rolling device adapted for use under severe condition such as high temperature, high operating speed, vacuum and low temperature conditions and capable of suppressing the contamination of the outer environment and ensuring an excellent torque life even where the rolling device is operated under the severe condition given above. The present invention also provides a rolling device adapted for use under severe condition such as high temperature, high operating speed and heavy load condition and producing an excellent seizing life. In other words, the present invention provides a rolling device adapted for use under severe condition and producing an excellent torque life even if driven under the severe condition.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rolling device comprising:
   a movable member capable of a rotary movement or a linear movement;
   a support member supporting the movable member;
   a rolling body interposed between the movable member and the support member and rolled in accordance with the movement of the movable member; and
   a lubricant arranged between the movable member and the support member on which the rolling body is rolled,
   wherein said lubricant is adapted for use under a high temperature, high operating speed and heavy load condition, said lubricant is leak and evaporation preventive, and said lubricant is a grease composition containing a mixture of a base oil and a thickener, said base oil being a liquid fluorinated polymer oil having a kinetic viscosity at 40° C. of 10 mm$^2$/sec to 400 mm$^2$/sec.

2. The rolling device according to claim 1, wherein said liquid fluorinated polymer oil has a kinetic viscosity at 40° C. falling within a range of between 13 mm$^2$/sec and 320 mm$^2$/sec.

3. The rolling device according to claim 1, wherein said liquid fluorinated polymer oil has a kinetic viscosity at 40° C. falling within a range of between 15 mm$^2$/sec and 270 mm$^2$/sec.

4. A rolling device comprising:
   a movable member capable of a rotary movement or a linear movement;
   a support member supporting the movable member;
   a rolling body interposed between the movable member and the support member and rolled in accordance with the movement of the movable member; and
   a lubricant arranged between the movable member and the support member on which the rolling body is rolled,
   wherein said lubricant is either one of:
   (1) a lubricant, which is adapted for use under a low temperature condition, which is leak and evaporation preventive, and which contains as a base oil a liquid fluorinated polymer oil having a kinetic viscosity at −20° C. falling within a range of between 100 mm$^2$/sec and 3,000 mm$^2$/sec, and a vapor pressure at 50° C. of $2\times10^{-4}$ Torr or less; and
   (2) a lubricant, which is adapted for use under a high temperature, high operating speed or vacuum condition, which is leak and evaporation preventive, and which contains as a base oil a liquid fluorinated polymer oil having a kinetic viscosity at 40° C. of 10 mm$^2$/sec to 400 mm$^2$/sec and a kinetic viscosity at 100° C. of 3 mm$^2$/sec to 80 mm$^2$/sec.

5. The rolling device according to claim 4, wherein said lubricant contains as the base oil either one of:
   (1) a liquid fluorinated polymer oil having a kinetic viscosity at −20° C. falling within a range of between 100 mm$^2$/sec and 2,500 mm$^2$/sec, and a vapor pressure at 50° C. of $5\times10^{-5}$ Torr or less; and
   (2) a liquid fluorinated polymer oil having a kinetic viscosity at 40° C. of 13 mm$^2$/sec to 320 mm$^2$/sec and a kinetic viscosity at 100° C. of 4 mm$^2$/sec to 60 mm$^2$/sec.

6. The rolling device according to claim 4, wherein said lubricant contains as the base oil either one of:
   (1) a liquid fluorinated polymer oil having a kinetic viscosity at −20° C. falling within a range of between 100 mm$^2$/sec and 2,000 mm$^2$/sec, and a vapor pressure at 50° C. of $5\times10^{-5}$ Torr or less; and
   (2) a liquid fluorinated polymer oil having a kinetic viscosity at 40° C. of 15 mm$^2$/sec to 270 mm$^2$/sec and a kinetic viscosity at 100° C. of 15 mm$^2$/sec to 50 mm$^2$/sec.

7. The rolling device according to claim any one of claims 4 to 6, wherein said lubricant contains 10% by weight to 45% by weight of a thickening agent consisting of at least one material selected from the group consisting of a solid fluorinated polymer, a layered mineral powder, ultra fine particles, and a white powder substantially all components thereof being nonmetal element.

8. The rolling device according to claim any one of claims 4 to 6, wherein said lubricant contains 15% by weight to 40% by weight of a thickening agent consisting of at least one material selected from the group consisting of a solid fluorinated polymer, a layered mineral powder, ultra fine particles, and a white powder substantially all components thereof being nonmetal element.

9. The rolling device according to claim 4, wherein said lubricant contains 20% by weight to 35% by weight of a thickening agent consisting of at least one material selected from the group consisting of a solid fluorinated polymer, a layered mineral powder, ultra fine particles, and a white powder substantially all components thereof being nonmetal element.

10. The rolling device according to claim 7, wherein said lubricant contains at least 25% by weight of a thickening agent consisting of at least one material selected from the group consisting of a solid fluorinated polymer, a layered mineral powder, ultra fine particles, and a white powder substantially all components thereof being nonmetal element.

11. The rolling device according to any one of claims 4 to 6, wherein said lubricant contains an oily compound having a perfluoropolyether skeleton as a backbone chain, with a polar group at one end or both ends of said backbone chain, and having a molecular weight not higher than 10,000.

12. The rolling device according to any one of claims 4 to 6, wherein said lubricant contains 10% by weight to 45% by weight of a thickening agent consisting of at least one material selected from the group consisting of a solid fluorinated polymer, a layered mineral powder having an average particle diameter of 0.1 $\mu$m to 10 $\mu$m, ultra fine particles consisting of an inorganic material having an average particle diameter not larger than 0.1 $\mu$m, organic ultra fine particles having an average particle diameter of 20 $\mu$m to 1.0 $\mu$m, and a white powder substantially all components thereof being nonmetal element and having an average particle diameter of 0.05 $\mu$m to 20.0 $\mu$m.

\* \* \* \* \*

UNITED STATES PATENT AND TRADEMARK OFFICE
CERTIFICATE OF CORRECTION

PATENT NO. : 6,432,887 B1
DATED : August 13, 2002
INVENTOR(S) : T. Yamamoto et al.

It is certified that error appears in the above-identified patent and that said Letters Patent is hereby corrected as shown below:

<u>Title page,</u>
Item [56], References Cited, insert after U.S. PATENT DOCUMENTS,
-- FOREIGN PATENT DOCUMENTS
        EP     0648832 A1    4/1995
        EP     0479200 A1    4/1992
        JP     10-184706    7/1998
        JP     1-132690     5/1989
        GB    2317656 A    4/1998

OTHER PUBLICATIONS
International Search Report --

Signed and Sealed this

Twenty-ninth Day of April, 2003

JAMES E. ROGAN
*Director of the United States Patent and Trademark Office*